(12) United States Patent
Hosoki

(10) Patent No.: US 9,632,233 B2
(45) Date of Patent: Apr. 25, 2017

(54) DISPLAY DEVICE AND TELEVISION DEVICE

(71) Applicant: Sharp Kabushiki Kaisha, Osaka-shi, Osaka (JP)

(72) Inventor: Mitsuru Hosoki, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/913,716

(22) PCT Filed: Jul. 18, 2014

(86) PCT No.: PCT/JP2014/069218
§ 371 (c)(1),
(2) Date: Feb. 23, 2016

(87) PCT Pub. No.: WO2015/059965
PCT Pub. Date: Apr. 30, 2015

(65) Prior Publication Data
US 2016/0209580 A1    Jul. 21, 2016

(30) Foreign Application Priority Data

Oct. 24, 2013    (JP) ................ 2013-221050

(51) Int. Cl.
| | | |
|---|---|---|
| *F21V 7/04* | (2006.01) | |
| *F21V 8/00* | (2006.01) | |
| *G02F 1/1345* | (2006.01) | |
| *H04N 3/12* | (2006.01) | |
| *G02F 1/1335* | (2006.01) | |

(52) U.S. Cl.
CPC ......... *G02B 6/0085* (2013.01); *G02B 6/0091* (2013.01); *G02F 1/13452* (2013.01); *H04N 3/127* (2013.01); *G02F 1/133615* (2013.01); *G02F 2001/133628* (2013.01)

(58) Field of Classification Search
CPC . G02B 6/0085; G02B 6/0091; G02F 1/13452; H04N 3/127
USPC ....................................... 362/606
See application file for complete search history.

(56) References Cited

U.S. PATENT DOCUMENTS

| | | | | |
|---|---|---|---|---|
| 9,301,428 B2 * | 3/2016 | Yu | ........... | H05K 7/20409 |
| 2001/0002145 A1 * | 5/2001 | Lee | ........... | G02F 1/133308 |
| | | | | 349/58 |
| 2006/0114694 A1 * | 6/2006 | Cho | ........... | G02B 6/0083 |
| | | | | 362/631 |

(Continued)

FOREIGN PATENT DOCUMENTS

JP    2009-075337 A    4/2009

*Primary Examiner* — Bryon T Gyllstrom

(57) ABSTRACT

A display device includes a light source, a light guide plate, a chassis, a display panel, a flexible circuit board, a signal transmission circuit board, and a first heat dissipation member. The chassis includes a bottom plate that includes a light source supporting portion and a light guide plate supporting portion. The bottom plate includes a surface on which the light source and the light guide plate are arranged. The flexible circuit board is bent and a portion thereof is opposed to another surface of the light source supporting portion. The signal transmission circuit board is arranged over the other surface. The first heat dissipation member is sandwiched between the light guide plate supporting portion and the flexible circuit board and in contact with the other surface and with the flexible circuit board.

13 Claims, 12 Drawing Sheets

(56) References Cited

U.S. PATENT DOCUMENTS

| | | | |
|---|---|---|---|
| 2006/0125981 A1* | 6/2006 | Okuda | G02F 1/133308 349/110 |
| 2007/0035473 A1* | 2/2007 | Yamazaki | G02F 1/13318 345/4 |
| 2009/0080148 A1 | 3/2009 | Sugawara | |
| 2010/0007817 A1* | 1/2010 | Kim | G02B 6/0083 349/60 |
| 2012/0229733 A1* | 9/2012 | Ishii | G02F 1/133382 349/72 |
| 2013/0002977 A1* | 1/2013 | Park | G02F 1/133308 349/58 |

* cited by examiner

DISPLAY DEVICE AND TELEVISION DEVICE

TECHNICAL FIELD

The present invention relates to a display device and a television device.

BACKGROUND ART

A display device that may be used for a liquid crystal television device is disclosed in Patent Document 1. The display device includes a light source and a light guide plate held by a chassis that is a case of the display device. The liquid crystal panel is arranged on the front of the chassis. A flexible circuit board is connected to a display surface of the liquid crystal panel and bent such that a portion thereof is arranged on the rear of the chassis. In such a display device, heat generated from the light source may be transferred to the rear of the chassis and the portion of the flexible circuit board and then dissipated to the outside of the display device.

RELATED ART DOCUMENT

Patent Document

Patent Document 1: Japanese Unexamined Patent Application Publication No. 2009-75337

Problem to be Solved by the Invention

In recent years, demands for liquid crystal panels having high definition such as 2K and 4K panels have been increased. The liquid crystal panel having high definition includes a large number of flexible circuit boards that are connected to an edge of a panel with little gaps to increase the number of image pixels. If the display device disclosed in Patent Document 1 includes a liquid crystal panel having high definition, a portion of the rear of the chassis is covered with a large number of flexible circuit boards and thus heat may remain in an air gap between the portion of the rear of the chassis and the flexible circuit boards. This may degrade heat dissipation performances of the display device for dissipating heat through the chassis.

DISCLOSURE OF THE PRESENT INVENTION

The technology disclosed in this description was made in view of the above circumstances. An object is to reduce or suppress degradation in heat dissipating performance through a chassis.

Means for Solving the Problem

The technology disclosed in this description includes a display device including a light source, a light guide plate, a chassis, a display panel, a flexible circuit board, a signal transmission circuit board, and a first heat dissipation member. The light guide plate includes at least one side surface that is a light entrance surface opposed to the light source. The chassis includes at least a bottom plate that includes a surface on which at least the light source and the light guide plate are arranged. The bottom plate includes a light source supporting portion and a light guide plate supporting portion. The light source supporting portion supports the light source. The light guide plate supporting portion supports the light guide plate. The display panel is arranged over a plate surface of the light guide plate opposite from a plate surface of the light guide plate facing the chassis. The flexible circuit board has flexibility and includes an end connected to the display panel. The flexible circuit board is bent and a portion of the flexible circuit board is opposed to another surface of the light source supporting portion of the bottom plate. The signal transmission circuit board is connected to another end of the flexible circuit board and arranged over the other surface of the light source supporting portion of the bottom plate for transmitting a signal to the flexible circuit board. The first heat dissipation member is sandwiched between the light guide plate supporting portion of the bottom plate and the flexible circuit board and in contact with the other surface of the light guide plate supporting portion of the bottom plate and with the flexible circuit board.

In the above display device, the other surface of the bottom plate of the chassis, that is, a surface of the bottom plate opposite from the surface of the bottom plate facing the light source and the light guide plate, is a surface facing the outside of the chassis. The first heat dissipation member closes an air gap between the surface of the light source supporting portion in the other surface of the bottom plate and the flexible circuit board. According to this configuration, heat transferred to the other surface of the light source supporting portion o of the bottom plate is efficiently transferred to the flexible circuit board through the first heat dissipation member. The heat transferred to the flexible circuit board is dissipated to the outside of the display device through the flexible circuit board. Thus, the heat is less likely to remain in the air gap between the surface of the light source supporting portion of the bottom plate on the other side and the flexible circuit board. That is, the heat does not or is less likely to remain in an air gap between the chassis and the flexible circuit board even though the light source supporting portion of the chassis is a portion to which the heat from the light source is more likely to be transferred. Thus, the performance of the display device for dissipating the heat through the chassis does not or is less likely to degrade even in the display device in which the flexible circuit board covers one of the surfaces of the light source supporting portion facing the outside of the chassis.

The display device may further includes a second heat dissipation member sandwiched between the other surface of the light guide plate supporting portion of the bottom plate and the signal transmission circuit board and in contact with the other surface of the light guide plate supporting portion of the bottom plate and the signal transmission circuit board.

The second heat dissipation member closes an air gap between the surface of the light guide plate supporting portion on the other side of the bottom plate and the signal transmission circuit board so that the heat that transferred to the light guide plate supporting portion of the bottom plate is efficiently transferred to the signal transmission circuit board through the second heat dissipation member. Thus, the heat is less likely to remain in the air gap between the other surface of the light guide plate supporting portion of the bottom plate and the signal transmission circuit board. That is, the heat does not or is less likely to remain in the air gap not only between the light source supporting portion and the flexible circuit board but also between the light guide plate supporting portion of the chassis and the signal transmission circuit board. Thus, the performance of the display device for dissipating the heat through the chassis does not degrade or is less likely to degrade even in the display device in which the flexible circuit board and the signal transmission circuit board cover the one of the surfaces of the chassis facing the outside.

The display device may further includes a circuit board cover and a third heat dissipation member. The circuit board cover may cover a surface of the signal transmission circuit board opposite from a surface of the signal transmission circuit board facing the other surface of the bottom plate. The third heat dissipation member may be sandwiched between the signal transmission circuit board and the circuit board cover and in contact with the signal transmission circuit board and the circuit board cover.

The third heat dissipation member closes an air gap between the signal transmission circuit board and the circuit board cover so that the heat from the signal transmission circuit board is efficiently transferred to the circuit board cover through the third heat dissipation member. Thus, heat is less likely to remain between the signal transmission circuit board and the circuit board cover. With the circuit board cover, the performance of the display device for dissipating the heat while the signal transmission circuit board is protected by the circuit board cover.

The circuit board cover may include an extending portion that extends to the flexible circuit board and covers a portion of the flexible circuit board opposed to the light source supporting portion. The display device may further include a fourth heat dissipation member that is sandwiched between the flexible circuit board and the fourth heat dissipation member and in contact with the flexible circuit board and the fourth heat dissipation member.

With the fourth heat dissipation member, the performance of the display device for dissipating the heat further improves while noises caused by the flexible circuit board is reduced by the extending portion that covers the portion of the flexible board. Furthermore, the extending board supports the flexible circuit board so that the flexible circuit board is less likely to warp. That is, the flexible circuit board remains in contact with the first heat dissipation member properly. Thus, heat dissipation properties of the chassis are further less likely to degrade.

The display device may further includes a light source board and a fifth heat dissipation member. The light source may be mounted to the light source board. The fifth heat dissipation member may include a portion that is sandwiched between the light source board and the chassis and in contact with the light source board and the chassis.

According to this configuration, the heat generated from the light source is efficiently transferred to the chassis through the fifth heat dissipation member. Thus, the performance of the display device for dissipating the heat further improves.

The fifth heat dissipation member may be in contact with surfaces of the light source board.

In comparison to a configuration that the fifth heat dissipation member is only in contact with a single surface of the light source board, the fifth heat dissipation member has a larger area that contacts the light source board. Thus, heat generated from the light source is more likely to propagate to the chassis through the fifth heat dissipation member. Thus, heat dissipation properties of the display device further improve.

The display device may further include a bezel, a driving component, and a sixth heat dissipation member. The bezel may have a frame-like shape and may be connected to the chassis on the one side. The driving component may be mounted on the flexible circuit board. The driving component may be configured to process the signal from the signal transmission circuit board and transmit a signal that is processed thereby to the display panel for driving the display panel. The sixth heat dissipation member may be sandwiched between the bezel and a portion of the flexible circuit board on which the driving component is mounted and in contact with the bezel and the portion of the flexible circuit board on which the driving component is mounted.

According to the configuration, heat from the driving component is effectively transferred to the bezel via the sixth heat dissipation member and thus heat dissipation properties of the display device improve.

The light source supporting portion of the bottom plate may protrude toward a direction in which the surface of the bottom plate on the other side faces and form a step together with the light guide plate supporting portion.

This configuration is for the light source that is arranged opposite to the light entrance surface of the light guide plate. The light source may require components including a board to mount them, wirings or traces, and connectors and thus the light source may require a space with a height larger than that of a space for the light guide plate. Since the bottom plate of the chassis in includes the light source supporting portion that protrudes to the other side, a space with a sufficient height is provided for the light source. The configuration that the light source supporting portion of the bottom plate protrude to the other side so as to form a step can be represented as that the light guide plate supporting portion is dented toward the liquid crystal panel with respect to the light source supporting portion. In this configuration, it is preferable to arrange the signal transmission circuit board at the light guide plate supporting portion in terms of reduction of overall thickness of the display device. However, to arrange the signal transmission circuit board at the light guide plate supporting portion, it is necessary to bend the flexible circuit board and arrange the flexible circuit board across the step formed by the light guide plate supporting portion. In general, although heat tends to stay in an area in which a flexible circuit board is arranged across a step, the configuration described above includes the first heat dissipation sheet. Thus, heat is less likely to stay in such an area. Namely, such a problem is solved.

The display device may further include a reflection sheet that is in contact with the surface of the bottom plate on the one side.

According to this configuration, reflectivity of the reflection sheet does not degrade or is less likely to degrade in comparison to a configuration that includes a heat dissipation sheet that is arranged between the surface of the bottom plate on the one side and the reflection sheet.

The reflection sheet may be sandwiched between the light guide plate and the surface of the bottom plate on the one side and in contact with the light guide plate and the surface of the bottom plate on the one side.

With the configuration that the reflection sheet is sandwiched between the light guide plate and the chassis, the reflection sheet does not warp or is less likely to warp due to heat.

The flexible circuit board may include a plurality of flexible circuit boards arranged along at least an end of the display panel. The first heat dissipation member may be arranged such that the first heat dissipation member closes an entirety of an air gap between the plurality of the flexible circuit boards and the surface of the bottom plate on the other side.

In a configuration that includes multiple flexible circuit boards, a large portion of the surface of the light source supporting portion of the chassis on the other side is covered with the flexible circuit boards. Therefore, heat is more likely to stay in the air gap between the surface of the chassis on the other side and the flexible circuit boards. According to the above configuration, the first heat dissipation member closes the entirety of the air gap in which heat tends to stay. Therefore, even if multiple flexible circuit boards are arranged, heat dissipation properties of the display device do not or are less likely to degrade. That is, the display device that includes the display panel having a high definition has high heat dissipation properties.

The technologies described in this specification may be applied to a display device including a liquid crystal panel that includes liquid crystals therein. Furthermore, a television device including the display device may be considered as new and advantageous.

Advantageous Effect of the Invention

According to the present invention, heat dissipating performances through the chassis is less likely to be degraded or degradation in heat dissipating performance is reduced.

MODE FOR CARRYING OUT THE INVENTION

<First Embodiment>

Figure 1:
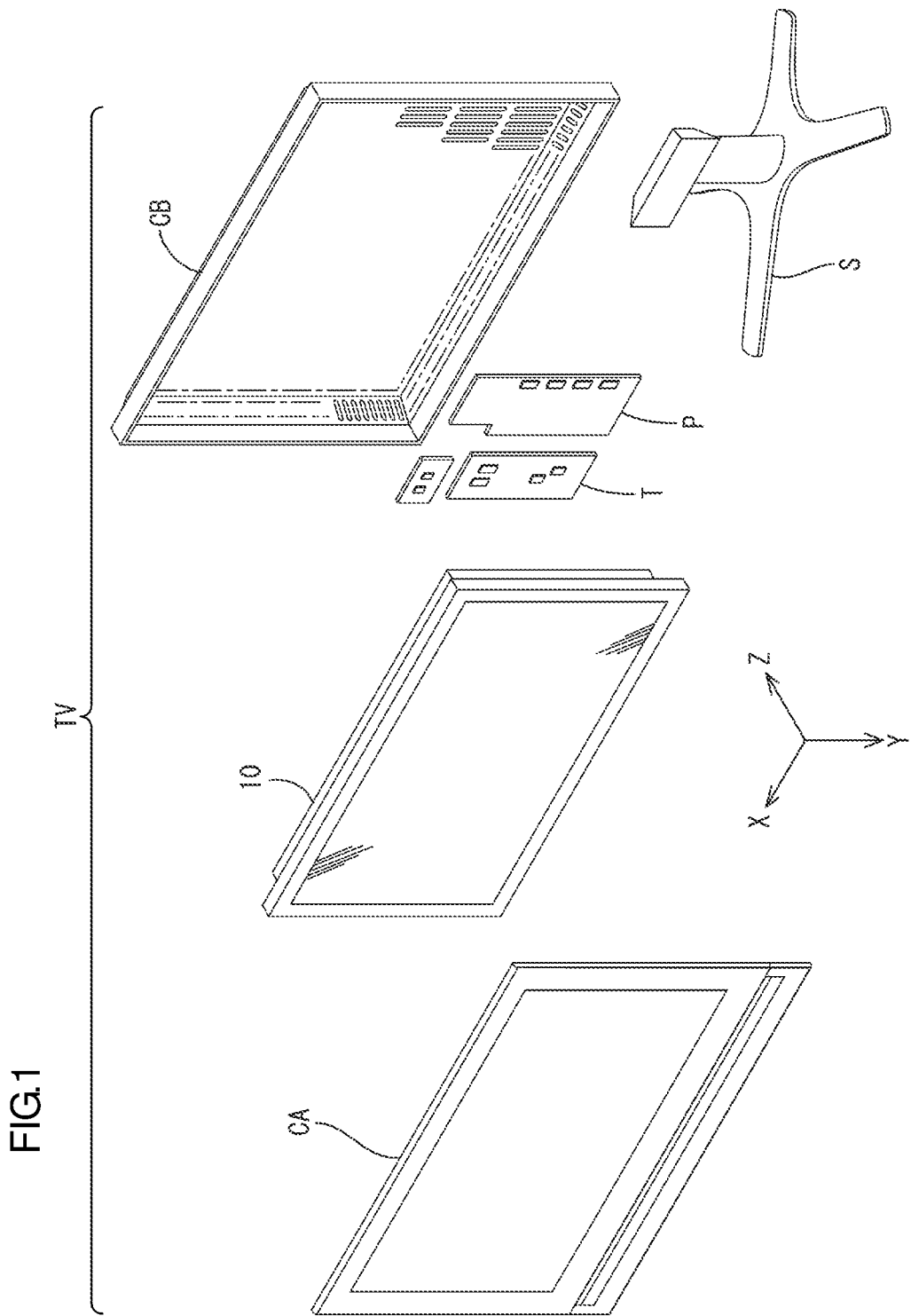
FIG. 1 is an exploded perspective view of a television device according to a first embodiment illustrating a general configuration thereof.

A first embodiment will be described with reference to the drawings. A liquid crystal display device (an example of a display device) 10 according to this embodiment will be described. X-axis, Y-axis and Z-axis may be indicated in the drawings. The axes in each drawing correspond to the respective axes in other drawings. The Y-axis direction corresponds to a vertical direction and the X-axis direction corresponds to a horizontal direction. The Z-axis direction corresponds to a thickness direction (i.e. a front-rear direction). An upper side in FIG. 2 corresponds to a front side of the liquid crystal display device 10. A lower side in FIG. 2 corresponds to a rear side of the liquid crystal display device 10.

A television device TV includes the liquid crystal display device 10, front and rear cabinets CA and CB that hold the liquid crystal display device 10 therebetween, a power source P, a tuner T, and a stand S. An overall shape of the liquid crystal display device 10 is landscape rectangular. The liquid crystal display device 10 includes a liquid crystal panel 11 as a display panel and a backlight unit 12 as an external light source. The liquid crystal panel 11 and the backlight unit 12 are collectively held by a bezel 13 having a frame-like shape. In the liquid crystal display device 10, the liquid crystal panel 11 is fixed such that a display surface 11C for displaying images faces the front. The liquid crystal panel 11 in this embodiment is a high definition panel including a large number of pixels, so-called e a 4K2K panel.

Figure 2:
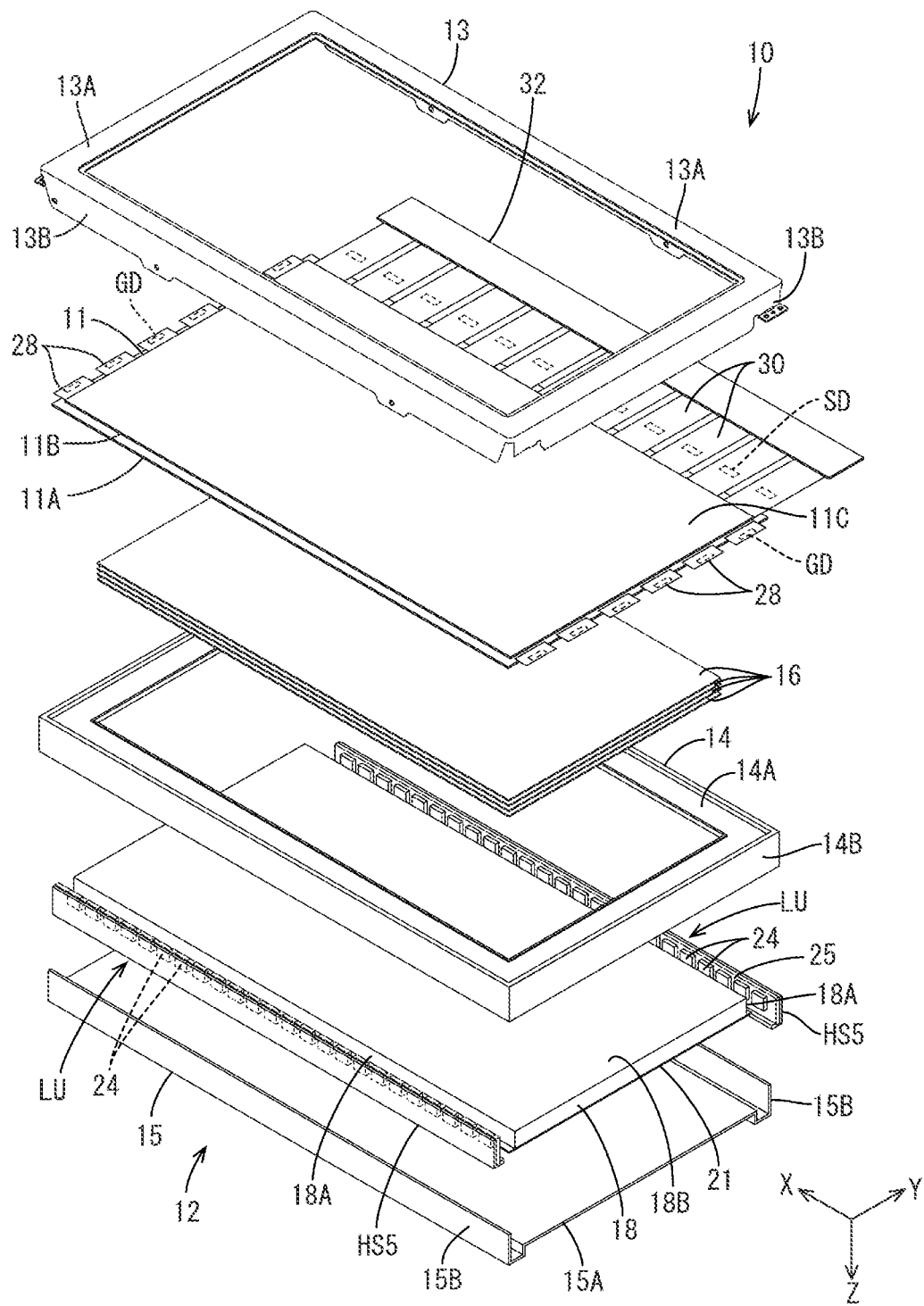
FIG. 2 is an exploded perspective view of a liquid crystal display device illustrating a general configuration thereof.
Figure 3:
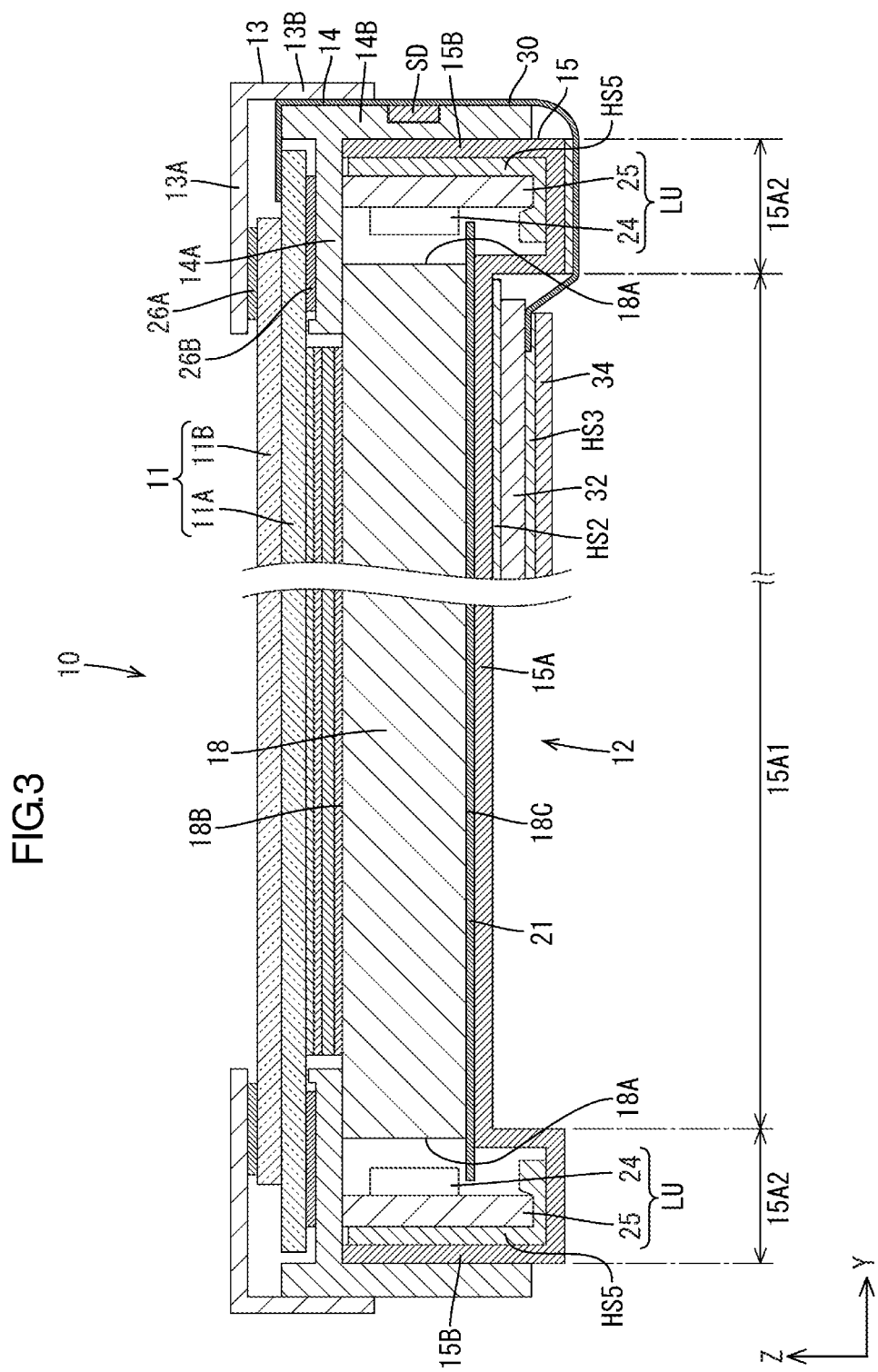
FIG. 3 is a cross-sectional view of the liquid crystal display device cut along a short-side direction thereof.

The bezel 13 is made of metal having high rigidity such as stainless steel. As illustrated in FIGS. 2 and 3, the bezel 13 includes a bezel frame-shaped portion 13A and a bezel peripheral wall portion 13B. The bezel frame-shaped portion 13A is parallel to the liquid crystal panel 11 and has a frame-like shape in a plan view. The bezel peripheral wall portion 13B extends from peripheral edges of the bezel frame-shaped portion 13A toward the rear to have a short box-wall shape. The bezel frame-shaped portion 13A extends along an outer portion of the display surface 11C of the liquid crystal panel 11. Between the bezel frame-shaped portion 13A and the liquid crystal panel 11, a cushioning member 26A is arranged. The bezel frame-shaped portion 13A retains the liquid crystal panel 11 by holding the outer portion of the display surface 11C from the front via the cushioning member 26A. The bezel peripheral wall portion 13B covers a portion of an outer surface of a frame 14, which will be described later. The bezel peripheral wall portion 13B constitutes a portion of a peripheral exterior of the liquid crystal display device 10.

The backlight unit 12 will be described. As illustrated in FIG. 2, components of the backlight unit 12 are arranged within space provided between the frame 14 and a chassis 15. The frame 14 constitutes a front exterior of the backlight unit 12. The chassis 15 constitutes a rear exterior of the backlight unit 12. Between the frame 14 and the chassis 15, components including at least a light guide plate 18, a reflection sheet 21, and LED units LU are arranged. Optical sheets 16 are arranged on the front side of the light guide plate 18. The light guide plate 18 is sandwiched and held by the frame 14 and the chassis 15. On the front side of the light guide plate 18, the liquid crystal panel 11 and the optical sheets 16 are arranged in this sequence from the front. The LED units LU in the backlight unit 12 are arranged in the space between the frame 14 and the chassis 15 along edges of a short-dimension of the light guide plate 18. Namely, the backlight units 12 of this embodiment are edge-light type unit. Each component of the backlight unit 12 will be described next.

The light guide plate 18 is made of substantially transparent (high transmissivity) synthetic resin (e.g. acrylic resin or polycarbonate such as PMMA) which has a refractive index sufficiently higher than that of the air. As illustrated in FIG. 2, the light guide plate 18 has a landscape rectangular shape in a plan view similar to the liquid crystal panel 11 and the optical sheets 16, which will be described later. A long-side direction and a short-side direction of a main surface of the light guide plate 18 correspond to the X-axis direction and the Y-axis direction, respectively. A thickness direction of the light guide plate 18 that is perpendicular to the main surface of the light guide plate 18 corresponds to the Z-axis direction. The light guide plate 18 is held by the chassis 15, which will be described later.

The light guide plate 18 includes two long-side peripheral surfaces that are configured as light entrance surfaces 18A and through which rays of light from the LED units enter the light guide plate 18. The light guide plate 18 further includes two main plate surfaces, one of which is a light exit surface 18B (a front plate surface) and the other one is an opposite surface 18C (a rear plate surface). The light guide plate 18 is arranged such that the two light entrance surfaces 18A are opposed to the respective LED units, the light exit surface 18B faces the optical sheets 16, and the opposite surface 18C faces the reflection sheet 21. The light guide plate 18 has a function of receiving rays of light emitted from the LED units LU to the light guide plate 18 through the light entrance surface 18A, transmitting the rays of light therethrough, and guiding the rays of light toward the optical sheets 16 so that the rays of light exit the light guide plate 18 through the light exit surface 18B.

The reflection sheet 21 is a rectangular sheet-like member made of a synthetic resin. The reflection sheet 21 includes a white surface having a high light reflectivity. A long-side direction and a short-side direction of the reflection sheet 21 correspond to the X-axis direction and the Y-axis direction, respectively. The reflection sheet 21 is sandwiched between the light guide plate 18 and the chassis 15 and in contact with the light guide plate 18 and the chassis 15. The reflection sheet 21 is configured to reflect rays of light that travel from the LED units LU or the light guide plate 18 toward the front surface of the reflection sheet 21. The reflection sheet 21 has a short-side dimension larger than a short-side dimension of the fixing member 28. As illustrated in FIG. 3, end portions of the reflection sheet 21 at ends of the long dimension of the reflection sheet 21 are located slightly outer than edges of the light entrance surfaces 18A of the light guide plate 18.

As illustrated in FIG. 2, similar to the light guide plate 18 and the liquid crystal panel 11, each optical sheet 16 has a landscape rectangular shape in a plan view and has a size (i.e., a short-side dimension and a long-side dimension) slightly smaller than that of the light exit surface 18B of the light guide plate 18 and the liquid crystal panel 11 in a plan view. Specific examples of the optical sheets 16 include a diffuser sheet, a lens sheet, and a reflective-type polarizing sheet and any of them are selected as appropriate for the optical sheets 16. The optical sheets 16 that are arranged between the light guide plate 18 and the liquid crystal panel 11 are configured to pass light from the light guide plate 18, to add specific optical effects to the light, and to direct the light toward the liquid crystal panel 11.

As illustrated in FIG. 2, the LED units LU are arranged along the long sides of the light guide plate 18, respectively. A long-side dimension of the LED unit LU is substantially the same as the long-side dimension of the light guide plate 18. Each LED unit LU includes LEDs (an example of a light source) 24 and an LED board (an example of a light source board) 25. Each of the LEDs 24 included in the LED units LU includes an LED chip (not illustrated) which is arranged on a board fixed to the LED board 25 and sealed with resin. The LED chip mounted on the board has one main light emission wavelength. Specifically, the LED chip that emits light in a single color of blue is used. The resin that seals the LED chip contains phosphors dispersed therein. The phosphors emit light in a predetermined color when excited by blue light emitted from the LED chip. Overall color of light emitted from the LED 24 is white. The phosphors may be selected, as appropriate, from yellow phosphors that emit yellow light, green phosphors that emit green light, and red phosphors that emit red light. The phosphors may be used in combination of the above phosphors. The LED 24 includes a main light-emitting surface that is an opposite surface (a surface facing the light entrance surface 18A of the light guide plate 18) from a mounting surface of the LED 24 which is fixed to the LED board 25. Namely, the LED 24 is a so-called top-surface-emitting type LED.

As illustrated in FIG. 2, the LED board 25 of the LED unit LU is made of aluminum, which has a heat dissipation property. The LED board 25 has an elongated plate-like shape that extends in the long-side direction of the chassis 15 (the X-axis direction) of the light guide plate 18. One of plate surfaces of the LED board 25 is parallel to the X-Z plane, that is, parallel to the light entrance surface 18A of the light guide plate 18. A long-side dimension of the LED board 25 (a dimension along the X-axis direction) is substantially the same as the long-side dimension of the light guide plate 18 (a dimension along the X-axis direction). A short-side dimension of the LED board 25 (a dimension along the Y-axis direction) is larger than the thickness of the light guide plate 18. The LEDs 24 are surface mounted on an inner surface of the LED board 25, that is, a surface of the LED board 25 facing the light guide plate 18 (an opposed surface to the light guide plate 18). The inner surface is a mounting surface. The LEDs 24 are arranged in a line (linearly) along the long direction (the X-axis direction) on the mounting surface of the LED board 25 at a predetermined interval. Metal film (e.g., copper foil) traces (not illustrated) are formed on the mount surface of each LED board 25. The traces extend along the X-axis direction and connect the adjacent LEDs 24 that across the group of the LEDs 24. The traces connect the adjacent LEDs 24 to each other in series. When terminals at ends of the traces are connected to a power board (not illustrated) via wiring members including connectors and electric wires, driving power is supplied to each LED 24.

Figure 7:
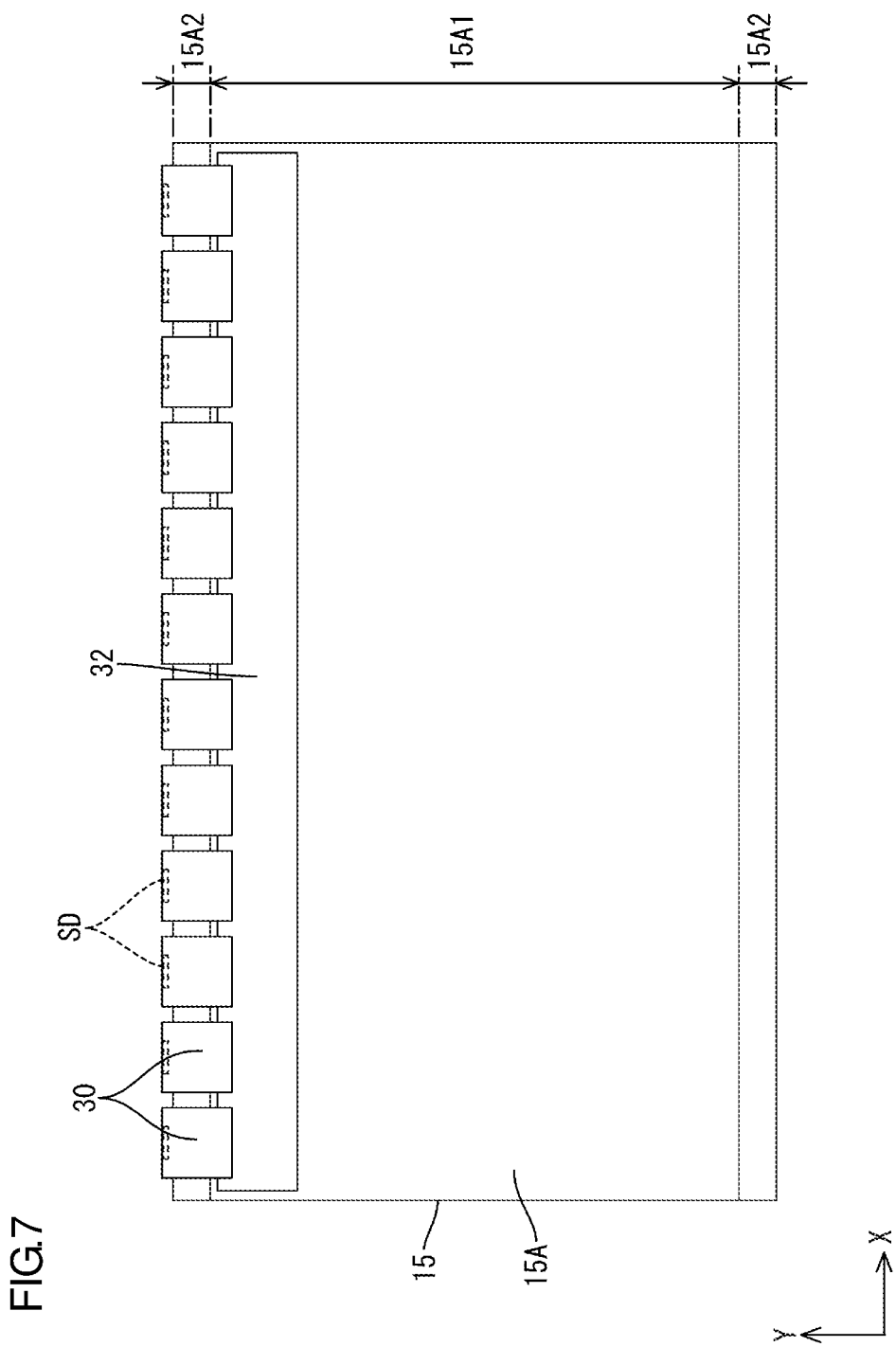
FIG. 7 is a plan view of a chassis viewed from the rear.

The chassis 15 constitutes a rear exterior of the liquid crystal display device 10. The chassis 15 is made of a metal plate such as an aluminum plate. As illustrated in FIG. 2, the chassis 15 has a landscape rectangular and shallow tray-like overall shape that covers substantially an entire area of a rear surface of the liquid crystal display device 10. The chassis 15 includes a bottom plate 15A and side plates 15B. The bottom plate 15A covers the rear of the liquid crystal panel 11. The side plates 15B extend frontward from long edges of the bottom plate 15A, respectively. As illustrated in FIG. 3, the bottom plate 15A includes a light guide plate supporting portion 15A1 and light source supporting portions 15A2. The light guide plate supporting portion 15A1 for supporting the light guide plate 18 from the rear (from an opposite surface 18C side) is a large portion of the bottom plate 15A. The light source supporting portions 15A2 are for supporting the respective LED units LU from the rear. The light source supporting portions 15A2 protrude from long-side edges of the light guide plate supporting portion 15A1 toward the rear side of the liquid crystal display device 10 so as to from steps together with the light guide plate supporting portion 15A1, respectively. That is, outer portions of the bottom plate 15A along long-sides thereof are the light source supporting portions 15A2 and a portion of the bottom plate 15A between the light source supporting portions 15A2 is the light guide plate supporting portion 15A1 (see FIG. 7). As illustrated in FIG. 3, a short-side dimension of the light guide plate supporting portion 15A1 is substantially the same as a short-side dimension of the light guide plate 18. A dimension of each side plate 15B measured along a direction in which the side plate 15B extends (a dimension measured along the Z-axis direction) is substantially the same as the sum of a dimension of the light guide plate 18 measured along the thickness thereof and a dimension of the light source supporting portion 15A2 measured along a direction in which the light source supporting portion 15A2 protrudes. The light source supporting portions 15A2 cover entire back surfaces of the respective LED units LU (a surface opposite from a surface facing a direction in which light from the LEDs 24 travels).

As illustrated in FIG. 3, heat dissipation sheets HS5 are arranged between the respective LED units LU and the chassis 15. The heat dissipation sheets HS5 are sheets having heat dissipative properties. Each heat dissipation sheet HS5 will be referred to as a fifth heat dissipation sheet (an example of a fifth heat dissipation member). A portion of the fifth heat dissipation sheet HS5 is sandwiched between the LED board 25 and the side plate 15B of the chassis 15. The fifth heat dissipation sheet HS5 bends so that another portion of the fifth heat dissipation sheet HS5 is sandwiched between the LED board 25 and the light source supporting portion 15A2 of the chassis 15 and in contact with the LED board 25 and the chassis 15. The fifth heat dissipation sheet HS5 is arranged in an entire area of the LED board 25 between the LED board 25 and the chassis 15 such that the LED board 25 is not in contact with the chassis 15. If the LED board 25 is in direct contact with the chassis 15, a gap may be created between the LED board 25 and the chassis 15 because the LED board 25 and the chassis 15 have different linear expansion coefficients. Heat may not be transferred from the LED board 25 to the chassis 15 because of the gap. In this embodiment, the fifth heat dissipation sheet HS5 is disposed between the LED board 25 and the chassis 15. Therefore, a gap is less likely to be created between the LED board 25 and the fifth heat dissipation sheet HS5 or between the LED board 25 and the chassis 15. Namely, a large amount of the heat generated from the LEDs 24 when the LEDs 24 are turned on is effectively transferred from the LED board 25 to the chassis 15 through the fifth heat dissipation sheet HS5.

The frame 14 has a horizontally-long frame shape similar to the bezel 13. The frame 14 is made of a synthetic resin (e.g. polycarbonate and polyethylene terephthalate). The frame 14 includes a frame-shaped portion 14A and a frame peripheral wall portion 14B. The frame-shaped portion 14A having a substantially frame-like shape is parallel to the liquid crystal panel 11. The frame peripheral wall portion 14B extends from outer edges of the frame-like portion 14A toward the front and the rear. The frame peripheral wall portion 14B has a shallow frame shape. The frame-shaped portion 14A extends along an outer portion of the light exit surface 18B of the light guide plate 18. The frame-shaped portion 14A holds down the outer portion of the light exit surface 18B from the front and thus the light guide plate 18 is held between the frame-shaped portion 14A and the light guide plate supporting portion 15A1. A cushioning member 26B is disposed between the frame-shaped portion 14A and the liquid crystal panel 11. Namely, the frame-shaped portion 14A holds down the liquid crystal panel 11 by applying pressure from a rear surface of the frame-shaped portion 14A to the outer portion of the liquid crystal panel 11 via the cushioning member 26B. The frame peripheral wall portion 14B includes two portions, one of which extends frontward and the other of which extends rearward from the outer edges of the frame-shaped portion 14A. The one of the portions extending rearward has a length longer than the other portion that extends frontward. The portion that extends rearward covers a large portion of the side plates 15B of the chassis 15 and constitutes a portion of the peripheral exterior of the liquid crystal display device 10. The portion that extends rearward includes driver holding recesses 14B1 in each of which a source driver SD, which will be described later, is arranged. Each driver holding recess 14B1 has an opening on an outer side (an opposite side from a side close to the side plate 15B).

Next, configuration of the liquid crystal panel 11 and configurations for driving the liquid crystal panel 11 will be described. As illustrated in FIGS. 2 and 3, the liquid crystal panel 11 has a landscape rectangular shape in a plan view. The liquid crystal panel 11 is disposed on the optical sheets 16. The liquid crystal panel 11 includes a pair of glass substrates 11A, 11B and liquid crystals. The substrates 11A, 11B having high light transmissivity are bonded together with a predetermined gap therebetween and the liquid crystals are sealed between the substrates 11A, 11B. The substrate on the front corresponds to a CF board 11B and the substrate on the rear corresponds to an array board 11A. On the array board 11A, switching elements (e.g. TFTs), pixel electrodes, and an alignment film are arranged. The switching elements are connected to gate lines and source lines that are arranged perpendicular to each other. The pixel electrodes are connected to the switching elements. On the array board 11A, a number of TFTs and a number of pixel electrodes are arranged. Furthermore, gate lines and source lines are arranged in a matrix around the TFTs and the pixel electrodes. The gate lines and the source lines are connected to gate electrodes and source electrodes, respectively. The pixel electrodes are connected to drain electrodes of the TFTs.

On the CF board 11B, capacitive lines (auxiliary capacitive lines, storage capacitive lines) are arranged parallel to the gate lines and so as to overlap the pixel electrodes in a plan view. The capacitive lines and the gate lines are alternately arranged in the Y-axis direction. On the CF board 11B, color filters, a counter electrode, and an alignment film are arranged. The color filters include red (R), green (G), and blue (B) color portions that are arranged in a predetermined arrangement. The display surface 11C of the liquid crystal panel 11 includes a display area and a non-display area. The display area is an inner area of a screen in which images are displayed. The non-display area is an outer area of the screen around the display area with a frame-like shape (or a picture frame-like shape) and covered by the bezel frame-shaped portion 13A of the bezel 13. The polarizing plates (not illustrated) are arranged on outer sides of the boards 11A and 11B.

Figure 6:
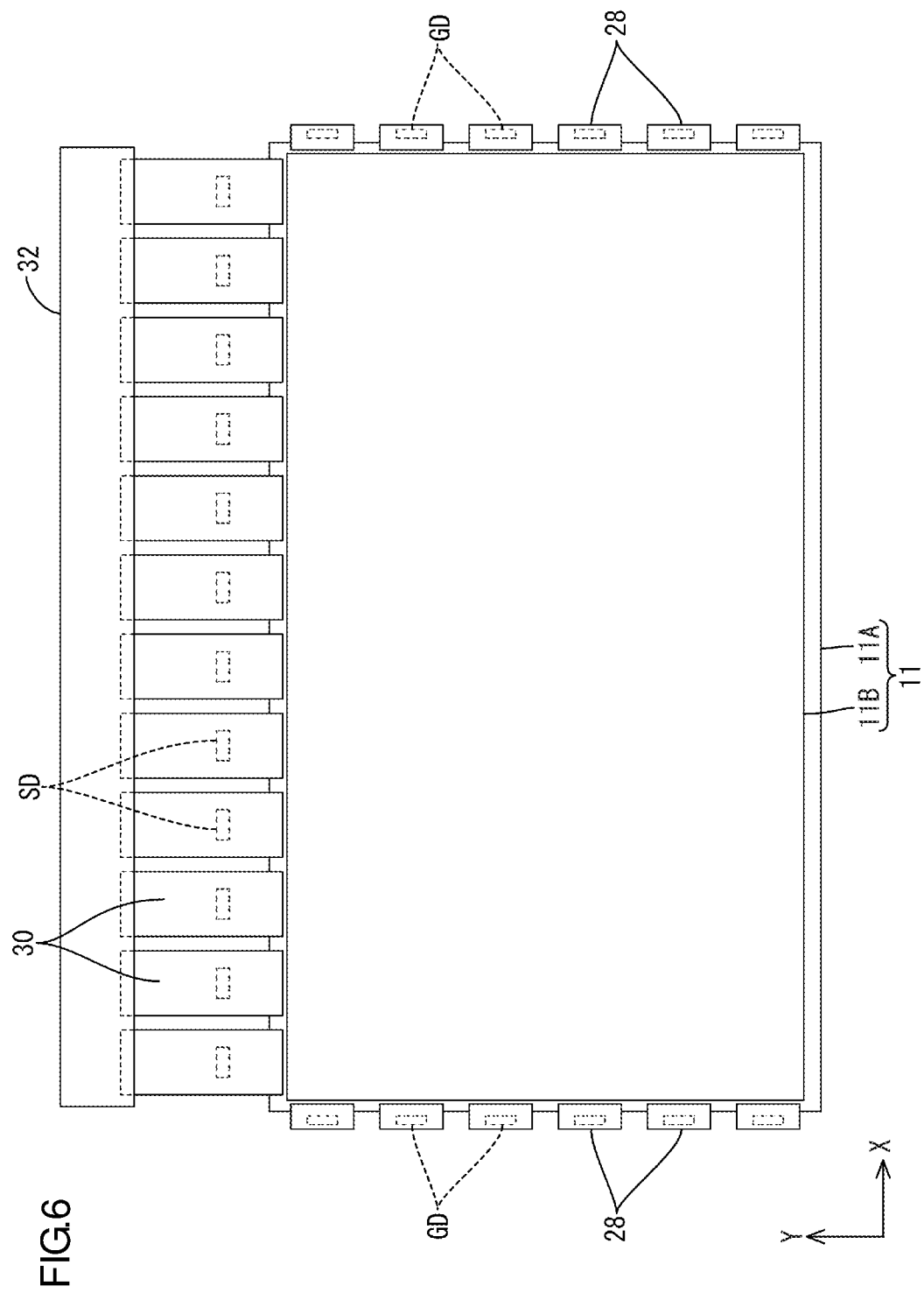
FIG. 6 is a plan view of a liquid crystal panel viewed from the rear.

As illustrated in FIGS. 3 and 6, the array board 11A of the pair of boards 11A, 11B included in the liquid crystal panel 11 is slightly larger than the CF board 11B such that outer edge portions of the array board 11A project over outer edge portions of the CF board 11B for an entire periphery. Gate terminals connected to the gate lines and the capacitive lines are disposed on one of short outer edge portions of the outer edge portions of the array board 11A. Gate flexible circuit boards 28 having flexibility are connected to the gate terminals, respectively. The gate flexible circuit boards 28 (six in each short edge portion in this embodiment) are arranged at about equal intervals along the Y-axis direction, that is, a direction along the short edge of the array board 11A. The gate flexible circuit boards 28 project outward over the short edge of the array board 11A. Source terminals connected to the source lines are disposed on one of long outer edge portions of the outer edge portions of the array board 11A (the one on the right in FIG. 3 or on the top in FIG. 6). Source flexible circuit boards (an example of a flexible board) 30 having flexibility are connected to the source terminals, respectively. The source flexible circuit boards 30 (twelve of them in this embodiment) are arranged at about equal intervals along the X-axis direction, that is, a direction along the long edge of the array board 11A. The source flexible circuit boards 30 project outward over the long edge of the array board 11A.

As illustrated in FIGS. 3 and 6, each of the gate flexible circuit boards 28 and each of the source flexible circuit boards 30 includes a film base member made of synthetic resin (e.g., polyimide resin) which has insulating and flexible properties. On rear surfaces of the gate flexible circuit boards 28, gate drivers GD for alignment of liquid crystals are mounted, respectively. On rear surfaces of the source flexible circuit boards 30, the source drivers SD are mounted, respectively. The gate drivers GD and the source drivers SD project inward from mount surfaces, respectively. Each of the gate drivers GD and the source drivers SD has a horizontally-long rectangular shape. Each of the gate driver GD and the source driver SD is an LSI chip including a drive circuit that is configured to process image-related input signals transmitted from the control circuit board (not illustrated), to generate output signals, and to send the output signals to the liquid crystal panel 11.

Figure 4:
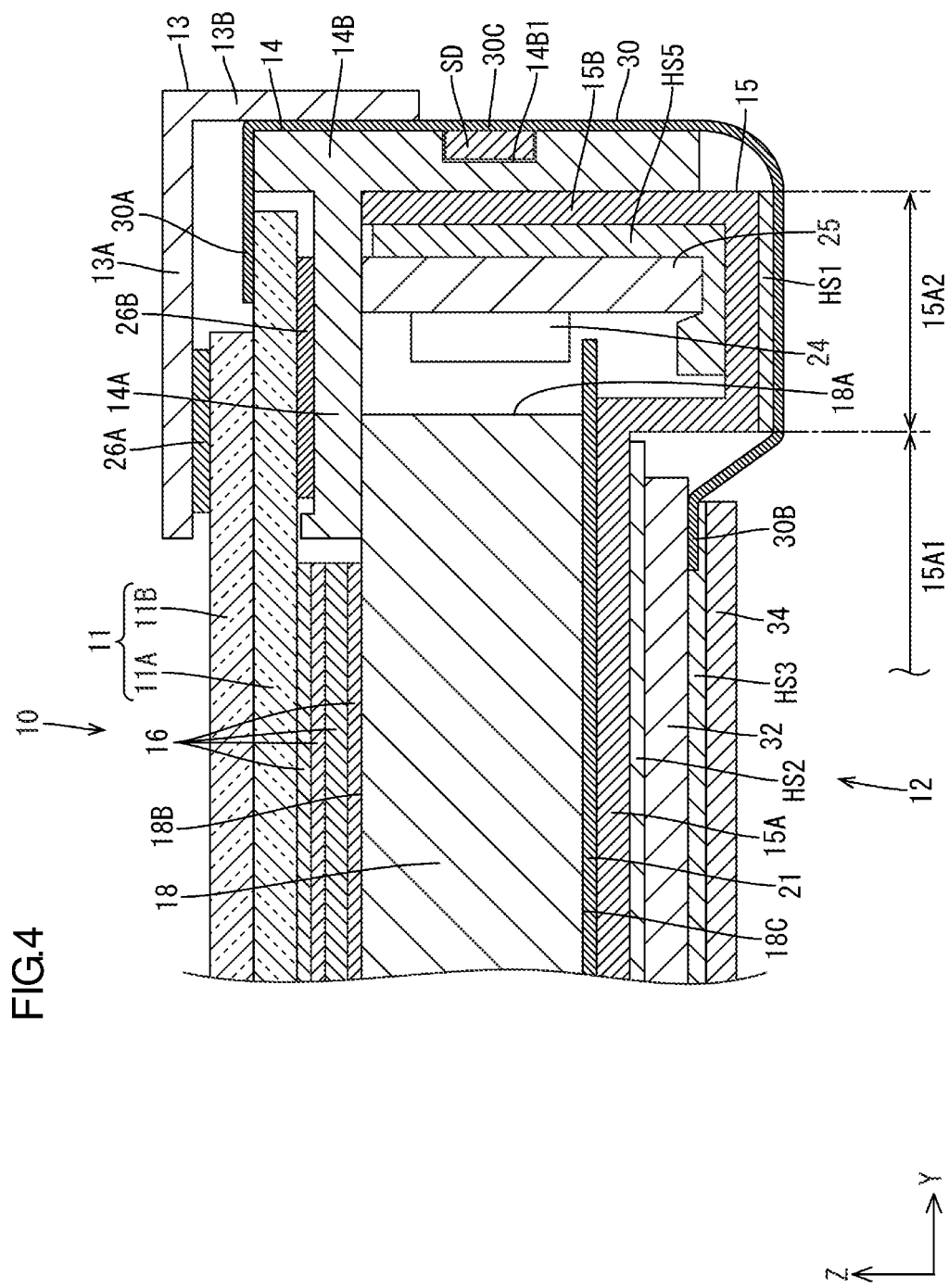
FIG. 4 is a magnified cross-sectional view of the liquid crystal display device in FIG. 3 illustrating a portion thereof at which a source circuit board is arranged.

The length of each source flexible circuit board 30 along a direction in which the source flexible circuit board 30 extends is longer than a length of the gate flexible circuit board 28 along a direction in which the gate flexible circuit board 28 extends. As illustrated in FIG. 4, the source flexible circuit board 30 includes an end 30A that is connected to the liquid crystal panel 11. The source flexible circuit board 30 is bent such that an end (another end) 30B of the source flexible circuit board 30 opposite from the end 30A is arranged at the rear of the bottom plate 15A of the chassis 15. At the rear of the light guide plate supporting portion 15A1 of the bottom plate 15A, a source circuit board (an example of a signal transmission circuit board) 32 is disposed (see FIG. 4). The ends 30A of the source flexible circuit boards 30 are pressure bonded to the respective source terminals formed on the array board 11A. The other ends 30B of the source flexible circuit boards 30 are pressure bonded to the source circuit board 32 via anisotropic conductive films (ACFs). Traces (not illustrated) are formed on inner surfaces of the source flexible circuit boards 30 (surfaces that face the chassis 15). One end of each trace is connected to the corresponding source terminal formed on the liquid crystal panel 11. The other end of the trance is connected to the source circuit board 32. Each of the source flexible circuit boards 30 is a single-side mounting type circuit board that includes a single mounting surface on which the traces are formed and the source driver SD is mounted. On the inner surface of the source flexible circuit board 30, an insulation coating is formed to cover large portions of the traces except for the ends of the traces. Thus, the trances are insulated.

A middle portion of the trace between the one end and the other end thereof (an intermediate portion) is connected to the source driver SD, which is mounted on the inner surface of the source flexible circuit board 30. As illustrated in FIG. 4, the source driver SD is entirely housed in the driver holding recess 14B1 that is formed in the frame peripheral wall portion 14B of the frame 14. Specifically, the source driver SD is arranged in the driver holding recess 14B1 with air gap therebetween. Namely, the source driver SD is not in contact with walls of the driver holding recess 14B1. The source flexible circuit boards 30 that include mounting portions 30C on which the respective source drivers SD are mounted may warp when the source drivers SD are brought into contact with the frame peripheral wall portion 14B of the frame 14. Because the source drivers SD do not contact the frame peripheral wall portion 14B of the frame 14, the mounting portions 30C of the source flexible circuit boards 30 do not or are less likely to warp. Therefore, an about entire inner surface of the source flexible circuit board 30 facing the frame peripheral wall portion 14B of the frame 14 is in contact with an outer surface of the frame peripheral wall portion 14B.

As illustrated in FIG. 6, the source circuit board 32 has an elongated shape along the X-axis direction. The source circuit board 32 is arranged in an area of the light guide plate supporting portion 15A1 adjacent to one of the light source supporting portions 15A2 (see FIG. 4). A plate surface of the source circuit board 32 is parallel to the X-Y plane, namely, parallel to the bottom plate 15A of the chassis 15. The source flexible circuit boards 30 in FIG. 6 is in a state before being bent. The source circuit board 32 includes a plate-like base member made of synthetic resin. Metal traces are formed on the base member. Terminals are connected to at least portions of the metal traces and the terminals are connected to the source flexible circuit boards 30.

As illustrated in FIG. 4, a heat dissipation sheet HS2 having heat dissipation properties is arranged between the bottom plate 15A of the chassis 15 and the source circuit board 32. The heat dissipation sheet HS2 will be referred to as a second heat dissipation sheet (an example of a second heat dissipation member) HS2 hereinafter. The second heat dissipation sheet HS2 is sandwiched between the bottom plate 15A of the chassis 15 and the source circuit board 32 and in contact with the bottom plate 15A and the source circuit board 32. That is, the second heat dissipation sheet HS2 closes an entire air gap between the source circuit board 32 and the bottom plate 15A of the chassis 15. Thus, heat transferred from the LED board 25 to the light guide plate supporting portion 15A1 of the bottom plate 15A of the chassis 15 is effectively transferred from the light guide plate supporting portion 15A1 to the source circuit board 32 via the second heat dissipation sheet HS2.

A circuit board cover 34 is disposed over an outer surface of the source circuit board 32 (i.e., a surface opposite from a surface that faces the second heat dissipation sheet HS2). The circuit board cover 34 covers an entire plate surface of the source circuit board 32. The circuit board cover 34 has a plate-like shape and arranged such that plate surfaces thereof are parallel to the X-Y plate, that is, parallel to the plate surface of the source circuit board 32. One of the plate surfaces of the circuit board cover 34 on the outer side (an opposite surface from a surface facing the source circuit board 32) is exposed to the outside of the liquid crystal display device 10. The circuit board cover 34 that covers the outer surface of the source circuit board 32 is a protector for protecting the source circuit board 32 from external objects. The circuit board cover 34 is arranged substantially on the same level with the rear surface of the light source supporting portion 15A2 of the bottom plate 15A of the chassis 15 (a position in the Z-axis direction).

As illustrated in FIG. 4, a heat dissipation sheet HS3 having heat dissipation properties is arranged between the source circuit board 32 and the circuit board cover 34. The heat dissipation sheet HS3 will be referred to as a third heat dissipation sheet (an example of a third heat dissipation member) HS3 hereinafter. The third heat dissipation sheet HS3 is sandwiched between the source circuit board 32 and the circuit board cover 34 and in contact with the source circuit board 32 and the circuit board cover 34. That is, the third heat dissipation sheet HS3 closes an entire air gap between the source circuit board 32 and the circuit board cover 34. Thus, heat transferred from the light guide plate supporting portion 15A1 of the bottom plate 15A of the chassis 15 to the source circuit board 32 is effectively transferred from the light guide plate supporting portion 15A1 to the circuit board cover 34 via the third heat dissipation sheet HS3. Then, the heat transferred to the circuit board cover 34 is dissipated to the outside of the liquid crystal display device 10.

As illustrated in FIG. 4, a heat dissipation sheet HS1 having heat dissipation properties is arranged between a portion of each source flexible circuit board 30 and the light source supporting portion 15A2. The portion of the source flexible circuit board 30 is opposed to the rear surface of the light source supporting portion 15A2. The heat dissipation sheet HS1 sheet will be referred to as a first heat dissipation sheet (an example of a first heat dissipation member) HS1 hereinafter. The first heat dissipation sheet HS1 has an elongated shape along the X-axis direction similar to the source circuit board 32. The first heat dissipation sheet HS1 is sandwiched between the source flexible circuit boards 30 and the bottom plate 15A of the chassis 15 and in contact with the source flexible circuit boards 30 and the bottom plate 15A. That is, the first heat dissipation sheet HS1 closes an air gap between the source flexible circuit boards 30 and the bottom plate 15A of the chassis 15. Thus, heat transferred from the LED board 25 to the light source supporting portion 15A2 of the bottom plate 15A of the chassis 15 is effectively transferred from the light source supporting portion 15A2 to the source flexible circuit boards 30. Then, the heat transferred to the source flexible circuit boards 30 is dissipated to the outside of the liquid crystal display device 10 through the source flexible circuit boards 30.

Each of the heat dissipation sheets HS1, HS2, HS3, and HS5 may be made of graphite. Each of the heat dissipation sheets HS1, HS2, HS3, and HS 5 includes adhesive surfaces. Each of the heat dissipation sheets HS1, HS2, HS3, and HS5 is sandwiched between the respective components with the adhesive surfaces stuck to the components. With this configuration, positions of the heat dissipation sheets HS1, HS2, HS3, and HS5 are less likely to change. The thicknesses of the heat dissipation sheets HS1, HS2, HS3, and HS5 may be altered as appropriate according to the thicknesses or arrangement of the source circuit board 32 and the LED boards 25. The second heat dissipation sheet HS2 and the third heat dissipation sheet HS3 may be made of materials having insulation properties to reduce or suppress short circuit.

Paths in which the heat is transferred in the liquid crystal display device 10 of this embodiment will be described. A large amount of heat generated from one of the LED boards 25 supported by the light source supporting portion 15A2 close to the source flexible circuit boards 30 is transferred to the corresponding side plate 15B and the light source supporting portion 15A2 of the bottom plate 15A of the chassis 15 via the fifth heat dissipation sheet HS5. A proportion of the heat transferred to the light source supporting portion 15A2 close to the source flexible circuit boards 30 is transferred to the light guide plate supporting portion 15A1 of the bottom plate 15A of the chassis 15. The rest of the heat is effectively transferred to the source flexible circuit boards 30 via the first heat dissipation sheet HS1 and then dissipated to the outside of the liquid crystal display device 10 through the source flexible circuit boards 30. The heat transferred to the light guide plate supporting portion 15A1 is effectively transferred from the light guide plate supporting portion 15A1 to the circuit board cover 34 through the second heat dissipation sheet HS2, the source circuit board 32, the third heat dissipation sheet HS3 in this sequence and dissipated to the outside of the liquid crystal display device 10 through the circuit board cover 34.

Figure 5:
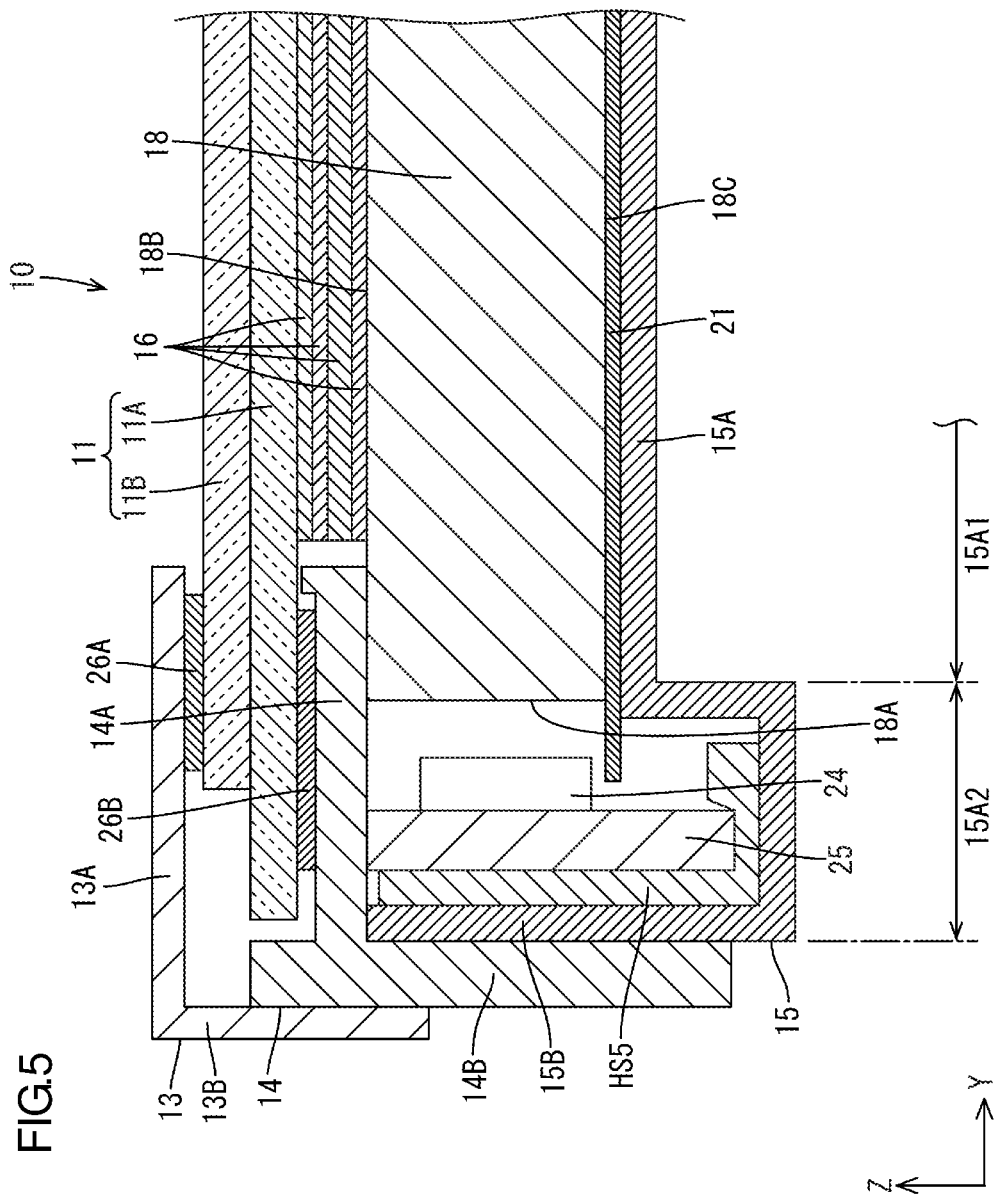
FIG. 5 is a magnified cross-sectional view of the liquid crystal display device in FIG. 3 illustrating a portion thereof at which a source circuit board is not arranged.

The source flexible circuit boards 30 are connected to one of the long edge portions of the liquid crystal panel 11. Namely, one of the light source supporting portions 15A2 of the bottom plate 15A of the chassis 15 different from the one close to the source flexible circuit boards 30 is exposed to the outside of the liquid crystal display device 10 (see FIGS. 5 and 7). Furthermore, the light guide plate supporting portion 15A1 of the bottom plate 15A of the chassis 15 includes a portion that is not opposed to the source circuit board 32. The rear surface of the portion not opposed to the source circuit board 32 is exposed to the outside of the liquid crystal display device 10 (see FIGS. 5 and 7). With this configuration, a large part of heat generated from one of the LED boards 25 supported by the light source supporting portion 15A2 on the other side from the side close to the source flexible circuit boards 30 is transferred to the chassis 15 via the fifth heat dissipation sheet HS5. The heat that is transferred to the chassis 15 is dissipated to the outside of the liquid crystal display device 10 directly from the bottom plate 15A of the chassis 15.

The source drivers SD are not in contact with the respective driver holding recesses 14B1. Therefore, a large part of heat produced from the source drivers SD transferred to the mounting portions 30C of the source flexible circuit boards 30 on which the respective source drivers SD are mounted. As illustrated in FIG. 4, the mounting portions 30C are exposed to the outside of the liquid crystal display device 10. Thus, heat that transferred from the source drivers SD to the mounting portions 30C are dissipated to the outside of the liquid crystal display device 10 through the mounting portions 30C.

As described above, in the liquid crystal display device 10 according to this embodiment, the first heat dissipation sheet HS1 closes the air gap between the rear surface of the light source supporting portion 15A2 of the bottom plate 15A and the source flexible circuit boards 30. Thus, the heat transferred to the rear surface of the light source supporting portion 15A2 of the bottom plate 15A is effectively dissipated to the source flexible circuit boards 30 via the first heat dissipation sheet HS1. The heat transferred to the source flexible circuit boards 30 is dissipated to the outside of the liquid crystal display device 10 through the source flexible circuit boards 30. Therefore, the heat is less likely to remain in the air gap between the rear surface of the light source supporting portion 15A2 of the bottom plate 15A and the source flexible circuit boards 30. Although the heat is more likely to be transferred to the light source supporting portion 15A2 of the bottom plate 15A of the chassis 15, the heat does not or is less likely to remain in the air gap between the light source supporting portion 15A2 of the bottom plate 15A and the source flexible circuit boards 30. Even though the liquid crystal display device 10 includes the light source supporting portion 15A2 including the outer surface covered with the source flexible circuit boards 30, the performance of the liquid crystal display device 10 for dissipating the heat through the chassis 15 does not or is less likely to degrade.

In this embodiment, the second heat dissipation sheet HS2 is sandwiched between the rear surface of the light guide plate supporting portion 15A1 of the bottom plate 15A and the source circuit board 32 and in contact with the rear surface of the light guide plate supporting portion 15A1 of the bottom plate 15A and the source circuit board 32. According to this configuration, the second heat dissipation sheet HS2 closes the air gap between the rear surface of the light guide plate supporting portion 15A1 of the bottom plate 15A and the source circuit board 32. Therefore, the heat transferred to the rear surface of the light guide plate supporting portion 15A1 of the bottom plate 15A is effectively transferred to the source circuit board 32 by the second heat dissipation sheet HS2. Namely, the heat is less likely to remain in the air gap between the rear surface of the light guide plate supporting portion 15A1 of the bottom plate 15A and the source circuit board 32. Since the heat does not or is less likely to remain in the air gap between the light guide plate supporting portion 15A1 of the chassis 15 and the source circuit board 32, the performance of the liquid crystal display device 10 for dissipating the heat through the chassis 15 does not or is less likely to degrade.

In this embodiment, the circuit board cover 34 covers the rear surface of the source circuit board 32. The third heat dissipation sheet HS3 is sandwiched between the source circuit board 32 and the circuit board cover 34 and in contact with the source circuit board 32 and the circuit board cover 34. The third heat dissipation sheet HS3 closes the air gap between the source circuit board 32 and the circuit board cover 34. According to this configuration, the third heat dissipation sheet HS3 effectively transfers the heat generated by the source circuit board 32 to the circuit board cover 34. Thus, the heat is less likely to remain in the air gap between the source circuit board 32 and the circuit board cover 34. Namely, the performance of the liquid crystal display device 10 for dissipating the heat through the circuit board cover 34 improves while the source circuit board 32 is protected by the circuit board cover 34.

Each of the fifth heat dissipation sheets HS5 is sandwiched between the chassis 15 and the corresponding LED board 25, which include the LEDs 24, and in contact with the chassis 15 and the corresponding LED board 25. Furthermore, each of the fifth heat dissipation sheets HS5 is in contact with several surfaces of the corresponding LED board 25. According to this configuration, the fifth heat dissipation sheets HS5 effectively transfer the heat generated by the LED boards 25 to the chassis 15. Thus, the performance of the liquid crystal display device 10 for dissipating the heat improves.

The light source supporting portions 15A2 of the bottom plate 15A of the chassis 15 project rearward and form steps together with the light guide plate supporting portion 15A1, respectively. This configuration is for the LEDs 24 that are arranged opposite to the light entrance surfaces 18A of the light guide plate 18. The LEDs 24 may require components including the LED boards 25 on which the LEDs 24 are mounted, traces or patterns, and connectors. Thus, a space for holding the LEDs 24 may require a vertical dimension larger than that of a space for holding the light guide plate 18. Since the bottom plate 15A of the chassis 15 in this embodiment includes the light source supporting portions 15A2 that project rearward, the space has a vertical dimension sufficient for holding the LEDs 24. Furthermore, because the light source supporting portions 15A2 of the bottom plate 15A project rearward so as to form steps, the light guide plate supporting portion 15A1 is dented toward the liquid crystal panel 11 with respect to the light source supporting portions 15A2. In this configuration, it is preferable to arrange the source circuit board 32 in the light guide plate supporting portion 15A1 for reducing an overall thickness of the liquid crystal display device 10. However, to arrange the source circuit board 32 in the light guide plate supporting portion 15A1, the source flexible circuit boards 30 need to be bent to cross over the step formed by the light guide plate supporting portion 15A1. In general, heat tends to remain in an area in which a source flexible circuit board is bent to cross over a step. With the first heat dissipation sheet HS1, the problem that the heat remains in such an area can be resolved.

In this embodiment, the traces are formed on only a single surface of each LED board 25 because the LED board 25 is made of aluminum, namely, metal. Therefore, in comparison to the LED board 25 made of nonmetallic materials, the LED board 25 made of metal needs a larger plate surface. The bottom plate 15A of the chassis 15 of this embodiment has the shape as described earlier. According to the chassis 15 having such a shape, the LED boards 25 are easily arranged in areas of the chassis 15 in which the LED boards 25 overlap the respective light source supporting portions 15A2 in the plan view. Furthermore, portions of the chassis 15 in which the light guide plate supporting portions 15A1 overlap in a plan view have a relatively smaller thickness.

In this embodiment, the reflection sheet 21 is arranged so as to be in contact with the front surface of the bottom plate 15A of the chassis 15 and the opposite surface 18C of the light guide plate 18. If the reflection sheet 21 is arranged to be in contact with a heat dissipation sheet, the reflection sheet 21 may warp due to heat that is transferred to the heat dissipation sheet and thus reflectivity of the reflection sheet 21 may degrade. In contrast, since this embodiment includes the reflection sheet 21 that is not in contact with the heat dissipation sheet, the reflectivity of the reflection sheet 21 does not degrade or is less likely to degrade in comparison to a configuration that includes a heat dissipation sheet that is arranged between the front surface of the bottom plate 15A and the reflection sheet 21.

The reflection sheet 21 is sandwiched between the bottom plate 15A of the chassis 15 and the light guide plate 18 and in contact with the bottom plate 15A and the light guide plate 18. According to this configuration, warping of the reflection sheet 21 due to heat is effectively reduced or suppressed.

The first heat dissipation sheet HS1 of this embodiment closes the entire air gap between the source flexible circuit boards 30 and the rear surface of the light source supporting portion 15A2 of the chassis 15. Since the liquid crystal panel 11 of this embodiment has a high definition, the source flexible circuit boards 30 are arranged close to each other along the long-side end of the liquid crystal panel 11 (along the X-axis direction). Furthermore, the source flexible circuit boards 30 cover a large portion of the rear surface of the light source supporting portion 15A2. If the liquid crystal display device 10 includes the liquid crystal panel 11 having a particularly high definition, the distance between the adjacent source flexible circuit boards 30 further decreases as the size of the display surface 11C decreases. If the liquid crystal display device 10 includes a further high definition display, power consumption for turning on the LEDs 24 and for driving the source drivers SD increase and thus larger heat energy is produced in comparison to the liquid crystal display device 10 that does not include the liquid crystal panel 11 having a high definition. If the first heat dissipation sheet HS1 is not arranged, the heat is more likely to remain in an air gap between the source flexible circuit boards 30 and the rear surface of the light source supporting portion 15A2. In contrast, the first heat dissipation sheet HS1 of this embodiment closes the entirety of the air gap. According to this configuration, even though the source flexible circuit boards 30 are arranged close to one another, heat dissipation properties of the liquid crystal display device 10 does not degrade or is less likely to degrade. Namely, the liquid crystal display device 10 that includes the liquid crystal panel 11 having a high definition has high heat dissipation properties.

<Second Embodiment>

Figure 8:
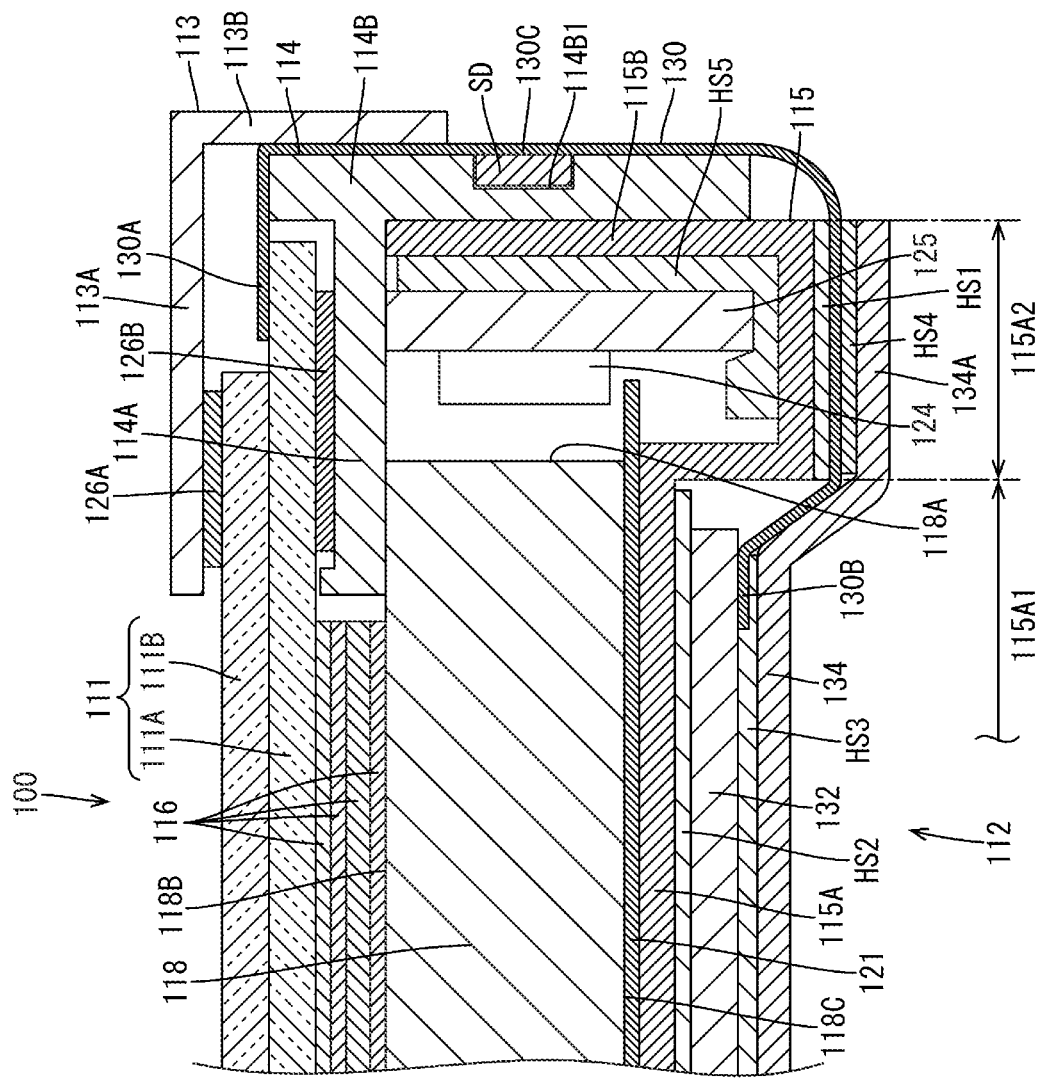
FIG. 8 is a cross-sectional view of a relevant portion of a liquid crystal display device according to a second embodiment.

A second embodiment will be described with reference to the drawings. The second embodiment includes a circuit board cover 134 having configurations different from that of the first embodiment. Furthermore, the second embodiment includes a fourth heat dissipation sheet HS4 which is not included in the first embodiment. Other configurations are similar to the first embodiment. Similar configurations, operations, and effects to the first embodiment will not be described. In FIG. 8, portions indicated by numerals including the reference numerals in FIG. 4 with 100 added thereto have the same configurations as the portions indicated by the respective reference numerals in the first embodiment.

A liquid crystal display device 110 according to the second embodiment includes the circuit board cover 134. As illustrated in FIG. 8, an end of the circuit board cover 134 closer to the first heat dissipation sheet HS1 is sloped toward the first heat dissipation sheet H1 and bent over a portion of a source flexible circuit board 130 opposite a light source supporting portion 115A2. A portion of the end extending along the light source supporting portion 115A2 will be referred to as an extending portion 134A hereinafter. Between the extending portion 134A and portions of the source flexible circuit boards 130 opposed to the light source supporting portion 115A2, the heat dissipation sheet HS4 having heat dissipation properties is arranged. The heat dissipation sheet HS4 will be referred to as the fourth heat dissipation sheet HS4 (an example of a fourth heat dissipation member) hereinafter. The fourth heat dissipation sheet HS4 is sandwiched between the extending portion 134A and the portions of the source flexible circuit boards 130 opposed to the light source supporting portion 115A2 and in contact with the extending portion 134A and the portions of the source flexible circuit boards 130 opposed to the light source supporting portion 115A2. The fourth heat dissipation sheet HS4 closes an entire air gap between the extending portion 134A and the portions of the source flexible circuit boards 130 opposed to the light source supporting portion 115A2. With this configuration, heat transferred to one of the light source supporting portions 115A2 close to the source flexible circuit boards 30 is effectively transferred to the extending portion 134A of the circuit board cover 134 from the first heat dissipation sheet HS1, the source flexible circuit boards 30, the fourth heat dissipation sheet HS4 in this sequence. Then, the heat transferred to the extending portion 134A of the circuit board cover 134 is dissipated to the outside of the liquid crystal display device 110 therethrough.

As described above, in the liquid crystal display device 110, the portions of the source flexible circuit boards 130 opposed to the light source supporting portion 115A2 are covered with the extending portion 134A of the circuit board cover 134. With the heat dissipation sheet HS4, the performance of the circuit board cover 134 improves while noise from the source flexible circuit boards 130 decreases. The portions of the source flexible circuit boards 130 opposed to the light source supporting portion 115A2 are supported by the extending portion 134A via the fourth heat dissipation sheet HS4. That is, the source flexible circuit boards 130 are less likely to warp and thus the source flexible circuit boards 130 preferably remain in contact with the first heat dissipation sheet HS1. According to this configuration, heat is more likely to be transferred from the light source supporting portion 115A2 to the source flexible circuit boards 130 via the first heat dissipation sheet HS1. Thus, the performance of the liquid crystal display device 110 for dissipating the heat through the chassis 115 does not or is less likely to degrade.

<Third Embodiment>

Figure 9:
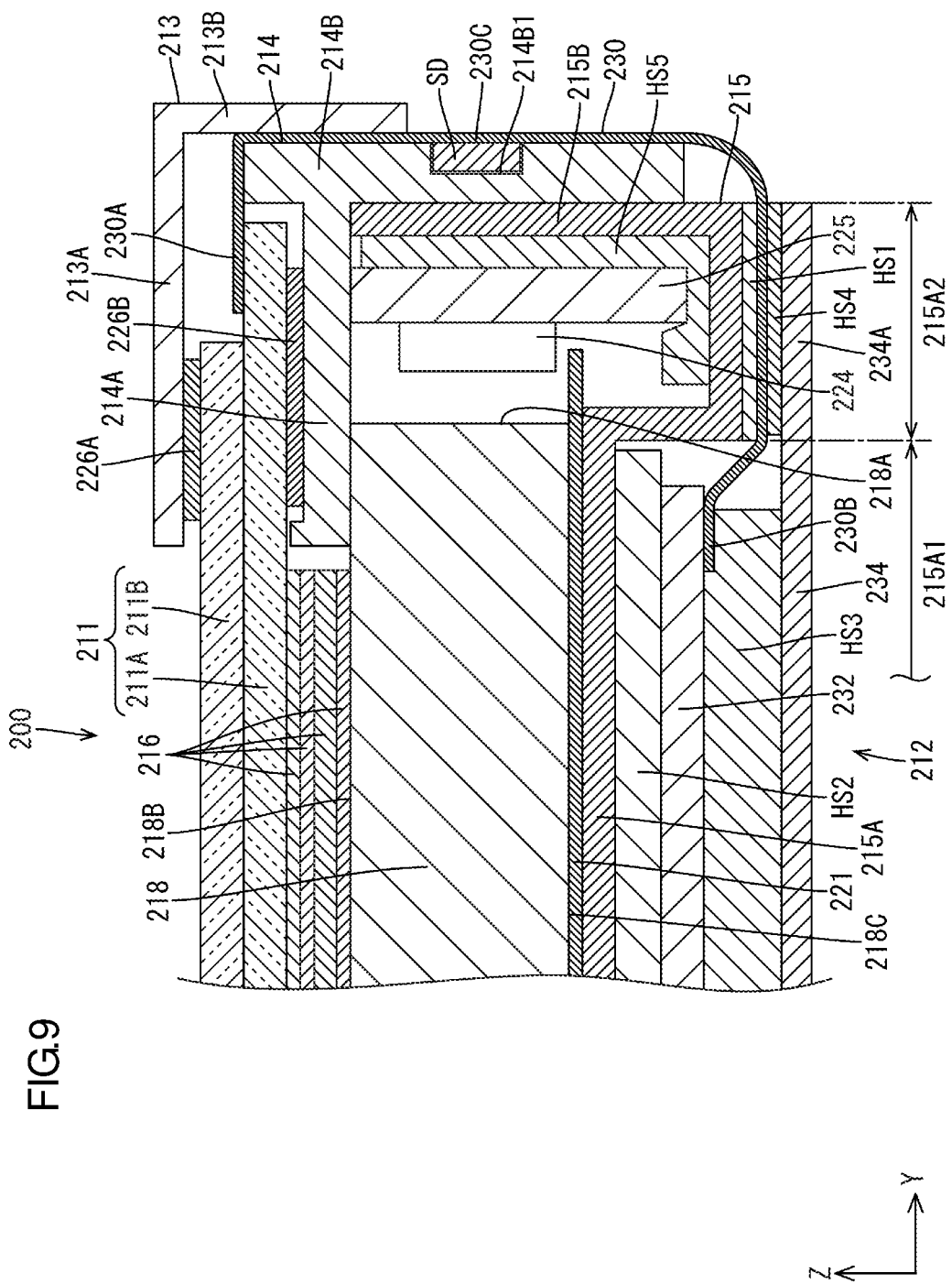
FIG. 9 is a cross-sectional view of a relevant portion of a liquid crystal display device according to a third embodiment.

A third embodiment will be described with reference to the drawings. In the third embodiment, configurations of a circuit board cover 234, the thickness of the second heat dissipation sheet HS2, and the thickness of the third heat dissipation sheet HS3 are different from those in the second embodiment. Other configurations are similar to the first and second embodiments. Similar configurations, operations, and effects to the first and second embodiments will not be described. In FIG. 9, portions indicated by numerals including the reference numerals in FIG. 4 with 200 added thereto have the same configurations as the portions indicated by the respective reference numerals in the first embodiment.

As illustrated in FIG. 9, in a liquid crystal display device 210, the second heat dissipation sheet HS2 and the third heat dissipation sheet HS3 each have a thickness larger than those in the first and second embodiments. The rear surface of the third heat dissipation sheet HS3 is at the same level with the rear surface of the fourth heat dissipation sheet HS4 (the position in the Z-axis direction). An end of the circuit board cover 234 closer to the first heat dissipation sheet HS1 extends in linear over the first heat dissipation sheet HS1 without slope or bend so as to cover portions of source flexible circuit boards 230 opposed to a light source supporting portion 215A2. The end of the circuit board cover 234 extending in linear will be referred to as an extending portion 234A. That is, the circuit board cover 234 including the extending portion 234A has a flat plate surface. According to this configuration, during production of the liquid crystal display device 210, mountability of the circuit board cover 234 to the third heat dissipation sheet HS3 and the fourth heat dissipation sheet HS4 improves. Furthermore, in comparison to the circuit board cover 134 of the second embodiment, the cost of processing the circuit board cover 234 during production reduces.

<Fourth Embodiment>

Figure 10:
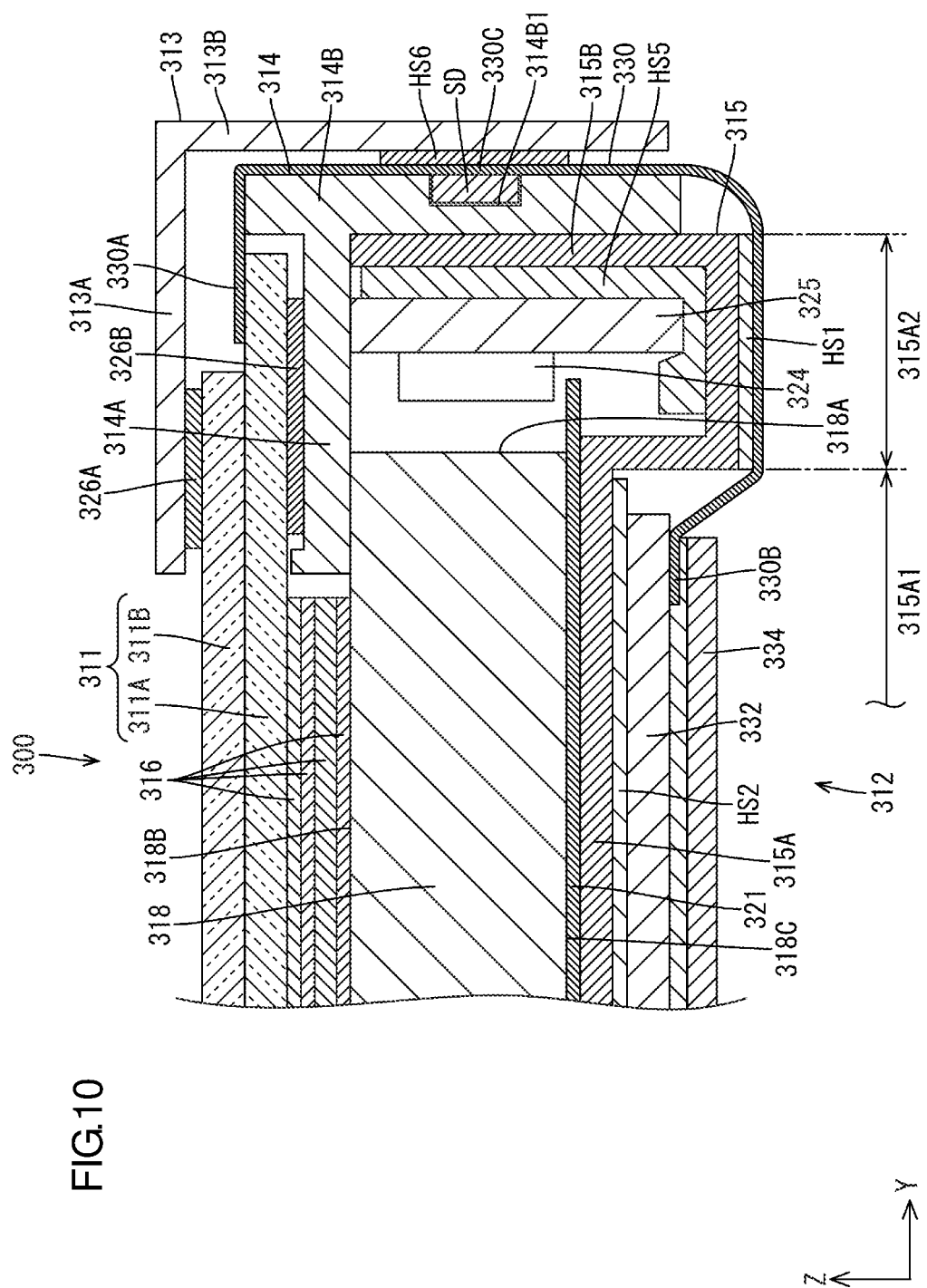
FIG. 10 is a cross-sectional view of a relevant portion of a liquid crystal display device according to a fourth embodiment.

A fourth embodiment will be described with reference to the drawings. The fourth embodiment differs from the first embodiment in that the fourth embodiment includes a sixth heat dissipation sheet HS6. Other configurations are similar to the first embodiment. Similar configurations, operations, and effects to the first embodiment will not be described. In FIG. 10, portions indicated by numerals including the reference numerals in FIG. 4 with 300 added thereto have the same configurations as the portions indicated by the respective reference numerals in the first embodiment.

As illustrated in FIG. 10, in a liquid crystal display device 310 according to the fourth embodiment, a bezel peripheral wall portion 313B of a bezel 313 extends rearward such that the bezel peripheral wall portion 313B covers substantially an entire area of a frame peripheral wall portion 314B of a frame 314. The heat dissipation sheet HS6 that is a sheet having heat dissipation properties is arranged between the bezel peripheral wall portion 313B of the bezel 313 and mounting portions 330C of source flexible circuit boards 330. The heat dissipation sheet HS6 is referred to as the sixth heat dissipation sheet (an example of a sixth heat dissipation sheet) HS6. The sixth heat dissipation sheet HS6 is sandwiched between the mounting portions 330C and the bezel peripheral wall portion 313B and in contact with the mounting portions 330C and the bezel peripheral wall portion 313B. The source drivers SD generate heat during driving and the heat is transferred to the mounting portions 330C. The sixth heat dissipation sheet HS6 effectively transfers the heat to the bezel peripheral wall portion 313B and thus the heat is dissipated to the outside of the liquid crystal display device 310 through the bezel peripheral wall portion 313B.

As described above, a large part of the heat generated from the source drivers SD is dissipated to the outside of the liquid crystal display device 310 through the bezel peripheral wall portion 313B and thus the performance of the liquid crystal display device 310 for dissipating the heat improves. In contrast, a large proportion of the heat generated from LED boards 325 is transferred to a bottom plate 315A of a chassis 315 and then dissipated to the outside of the liquid crystal display device 310 through outer surfaces of portions of the source flexible circuit boards 330 opposed to a light source supporting portion 315A2 and an outer surface of a circuit board cover 334. That is, the heat generated by the source drivers SD is separated from the heat generated by the LED board 325. Therefore, the heat is sufficiently dissipated through the bottom plate 315A of the chassis 315 (the rear side of the liquid crystal display device 310) in comparison to a configuration that a large part of heat from the source drivers SD and a large part of heat from the LED board 325 are transferred to the bottom plate 315A of the chassis 315 and a large part of heat is gathered to the bottom plate 315A of the chassis 315. Thus, the performance of the liquid crystal display device 310 for dissipating the heat improves.

<Fifth Embodiment>

Figure 11:
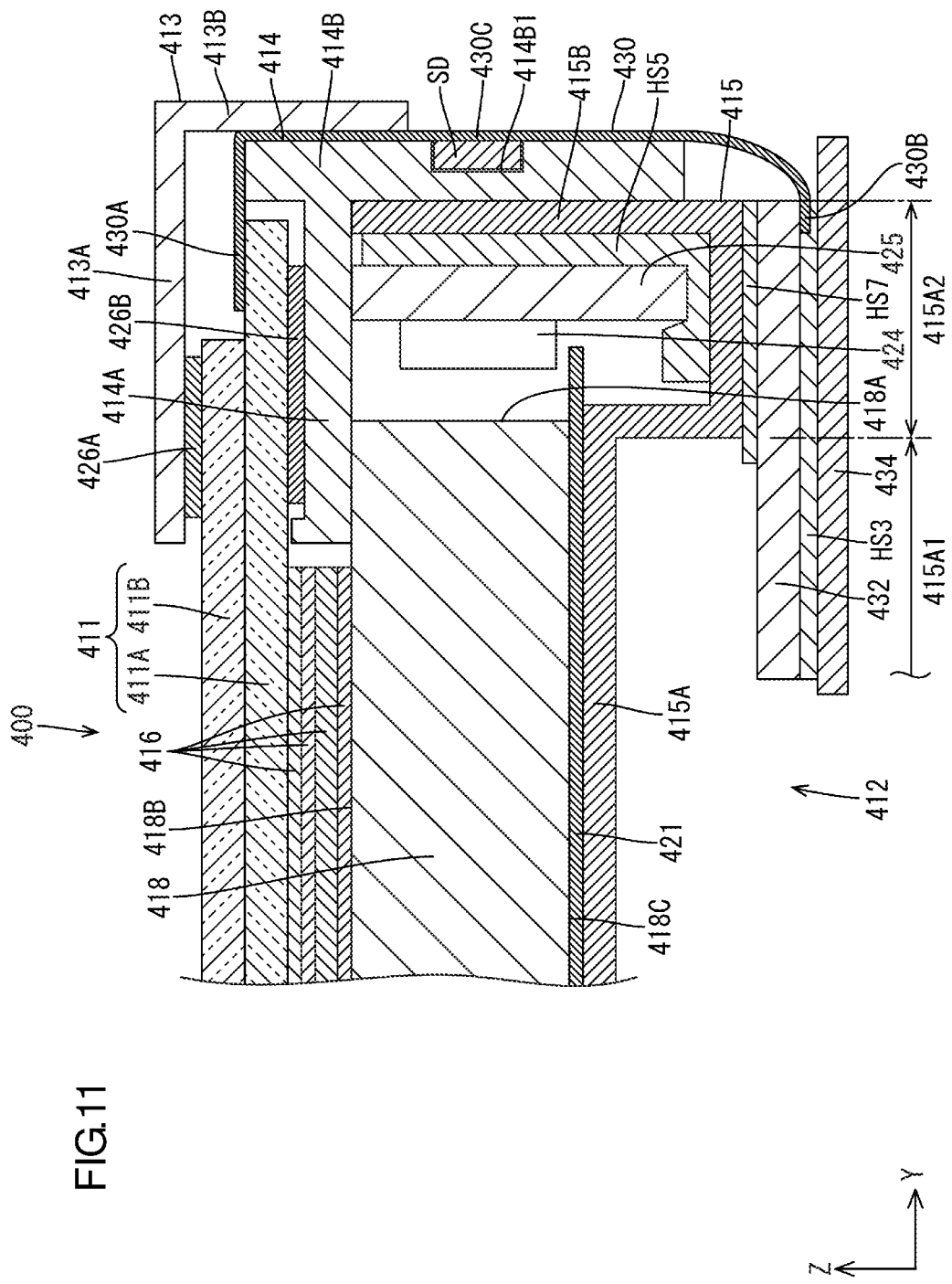
FIG. 11 is a cross-sectional view of a relevant portion of a liquid crystal display device according to a fifth embodiment.

A fifth embodiment will be described with reference to the drawings. The fifth embodiment includes a source circuit board 432, the arrangement of which differs from the first embodiment. Furthermore, the fifth embodiment includes source flexible circuit boards 430, the length of each of which differs from that in the first embodiment. Other configurations are similar to the first embodiment. Similar configurations, operations, and effects to the first embodiment will not be described. In FIG. 11, portions indicated by numerals including the reference numerals in FIG. 4 with 400 added thereto have the same configurations as the portions indicated by the respective reference numerals in the first embodiment.

As illustrated in FIG. 11, in a liquid crystal display device 410 according to the fifth embodiment, the source circuit board 432 is arranged so as to cover a rear surface of a light source supporting portion 415A2 of a bottom plate 415A of a chassis 415, namely, the source circuit board 432 is not arranged on a rear surface of a light guide plate supporting portion 415A1 of the bottom plate 415A of the chassis 415. A seventh heat dissipation sheet HS7 is arranged between the source circuit board 432 and the light source supporting portion 415A2 of the bottom plate 415A covered with the source circuit board 432. The seventh heat dissipation sheet HS7 is in contact with the source circuit board 432 and the light source supporting portion 415A2 of the bottom plate 415A. The seventh heat dissipation sheet HS7 closes an entire air gap between the source circuit board 432 and the light source supporting portion 415A2 of the bottom plate 415A covered with the source circuit board 432. The length of each source flexible circuit board 430 measured from an end portion 430A that is connected to a liquid crystal panel 11 is shorter than that of the first embodiment. Another end portion 430B of the source flexible circuit board 430 is connected to the source circuit board 432. On the outer side of the source circuit board 432, a circuit board cover 434 is arranged so as to cover an entire plate surface of the source circuit board 432 similar to the first embodiment. The third heat dissipation sheet HS3 is sandwiched between the source circuit board 432 and the circuit board cover 434 and in contact with the source circuit board 432 and the circuit board cover 434.

According to the above configuration, the heat transferred to the light source supporting portion 415A2 of the bottom plate 415A opposed to the source circuit board 432 is transferred to the circuit board cover 434 via the seventh heat dissipation sheet HS7, the source circuit board 432, and the third heat dissipation sheet HS3 in this sequence. The heat is dissipated to the outside of the liquid crystal display device 410 through the circuit board cover 434. The heat that is transferred to portions of the bottom plate 415A other than the light source supporting portion 415A2 opposed to the source circuit board 432 is directly dissipated to the outside of the liquid crystal display device 410 through the bottom plate 415A. In this embodiment, the thickness of the liquid crystal display device 410 increases at a portion thereof including the light source supporting portion 415A2 because the seventh heat dissipation sheet HS7, the source circuit board 432, the third heat dissipation sheet HS3, and the circuit board cover 434 are arranged on the rear side of the light source supporting portion 415A2. However, if there is no restrictions to the thickness of the liquid crystal display device 410, the heat dissipation properties of the liquid crystal display device 410 increase even in such a configuration.

<Sixth Embodiment>

Figure 12:
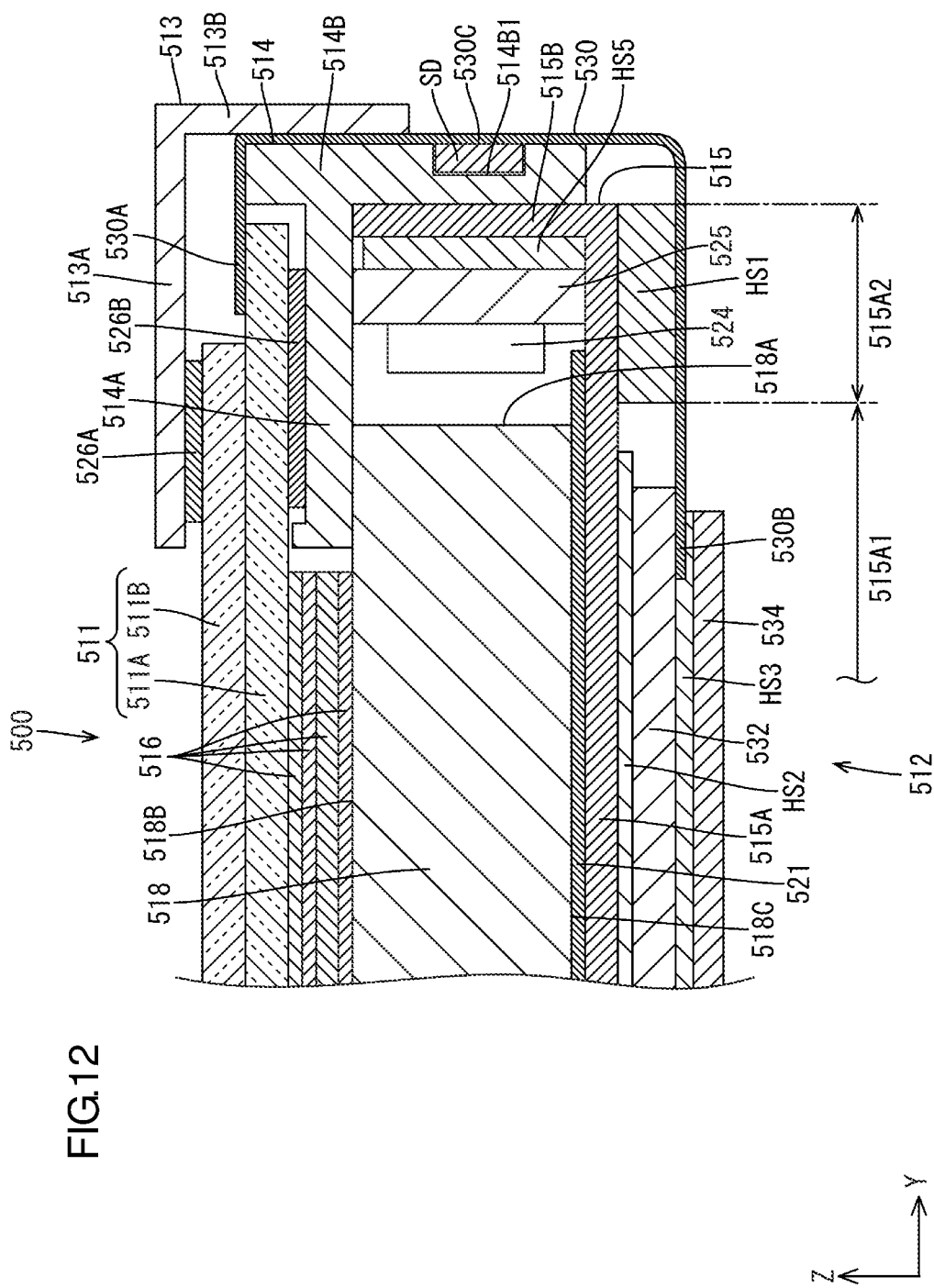
FIG. 12 is a cross-sectional view of a relevant portion of a liquid crystal display device according to a sixth embodiment.

A sixth embodiment will be described with reference to the drawings. The sixth embodiment includes a chassis 515, configurations of a bottom plate 515A of which are different from those of the first embodiment. Other configurations are similar to the first embodiment. Similar configurations, operations, and effects to the first embodiment will not be described. In FIG. 12, portions indicated by numerals including the reference numerals in FIG. 4 with 500 added thereto have the same configurations as the portions indicated by the respective reference numerals in the first embodiment.

As illustrated in FIG. 12, in a liquid crystal display device 510 according to the sixth embodiment, the bottom plate 515A of the chassis has a flat plate-like shape. Namely, the bottom plate 515A does not have steps. LED boards 525 of this embodiment are made of non-metallic material. Each LED board 525 has a dimension measured along a short-side direction thereof (i.e. a dimension measured along the Z-axis direction) smaller than that of the first or fifth embodiment. The LED board 525 is arranged within the chassis 515. Even with such a configuration, the first heat dissipation sheet HS1 effectively transfers the heat that is transferred to the rear surface of the light source supporting portion 515A2 of the bottom plate 515A to the source flexible circuit boards 530. The source flexible circuit boards 530 dissipate heat to the outside of the liquid crystal display device 510 therethrough. Therefore, heat is less likely to stay in the air gap between the chassis 515 and the source flexible circuit boards 530. Namely, of the performance for dissipating the heat through the chassis 515 does not or is less likely to degrade.

Modifications of the above embodiments will be described below.

(1) In each of the above embodiments, the first heat dissipation sheet is a single sheet having an elongated shape. However, the shape and the number of the first heat dissipation sheet are not limited thereto. Multiple first heat dissipation sheets may be arranged between the source flexible circuit boards and the bottom plate such that the first heat dissipation sheets overlap the respective source flexible circuit boards.

(2) In each of the above embodiments, the first heat dissipation sheet is arranged only between the light source supporting portion of the bottom plate of the chassis and the source flexible circuit boards. However, a portion of the first heat dissipation sheet may extend to the rear surface of the light guide plate supporting portion of the bottom plate or the outer surface of the side plate of the chassis.

(3) Each of the above embodiments includes the circuit board cover for covering the source circuit board. However, the circuit board cover and the third heat dissipation sheet may be omitted. In such a case, an outer surface of the source circuit board may be exposed to the outside of the liquid crystal display device and thus heat transferred to the source circuit board may be directly dissipated to the outside of the liquid crystal display device through the source circuit board.

(4) In each of the second and third embodiments, the source flexible circuit boards are covered with the circuit board cover. However, if the first heat dissipation sheet is used as a cushioning member to connect the source flexible circuit boards to the bottom plate of the chassis, the fourth heat dissipation sheet may be omitted.

(5) In each of the above embodiments, the source drivers are arranged in the respective driver holding recesses formed in the frame peripheral wall portion of the frame. However, the frame peripheral wall portion may not include the driver holding recesses and the source drivers may be in contact with the frame peripheral wall portion. Even in such a case, if an embodiment includes the configurations included in the fourth embodiment, heat generated from the source drivers may be effectively transferred to the bezel via the sixth heat dissipation sheet and dissipated to the outside of the liquid crystal display device.

(6) In each of the above embodiments, the frame between the source drivers and the side plate of the chassis is made of polycarbonate or polyethylene terephthalate; however, the material thereof is not limited thereto. For example, the frame may be made of polystyrene (thermal conductivity: 2.4 to 3.3 (10-4 cal/sec/° C.·cm)), which has a thermal conductivity lower than polycarbonate (thermal conductivity: 4.6 (10-4 cal/sec/° C.·cm)) and polyethylene terephthalate (thermal conductivity: 3.63 (10-4 cal/sec/° C.·cm)). If not only the heat generated from the LED board but also the heat generated from the source drivers are transferred to the chassis, the life of the LEDs may shorten due to an increase in temperature of the LED, or the light guide plate may warp and the optical sheet may wrinkle and warp due to an increase in temperature inside the chassis. With the frame having a lower thermal conductivity, the heat generated from the source drivers is less likely to be transferred to the chassis. Thus such problems do not occur or are less likely to occur.

(7) In each of the above embodiments, the side plate of the chassis is in contact with the frame peripheral wall portion while the source drivers are arranged in the driver holding recesses formed in the frame peripheral wall portion. However, configurations between the source drivers and the side plate of the chassis are not limited thereto. For example, thermal blocking members made of urethane may be arranged in a part or an entire area between the source driver and the side plate of the chassis (e.g. the side plate of the chassis and the frame peripheral wall portion, or the bottom portions of the driver holding recesses). If not only heat generated from the LED board but also heat generated from the source drivers are transferred to the chassis, the life of the LEDs may decrease due to an increase in temperature of the LED, the light guide plate may warp, and the optical sheet may wrinkle and warp due to an increase in temperature inside the chassis. With thermal blocking members, the heat generated by the source drivers is not or is less likely to be transferred to the chassis in comparison to each of the above described embodiments. Thus such problems do not occur or are less likely to occur.

(8) In each of the above embodiments, the television device includes the cabinets. However, the present invention may be applied to television devices without cabinets.

(9) In each of the above embodiments, the liquid crystal panel has high definition. However, the present invention may be applied to liquid crystal panels that do not have high definition.

(10) In each of the above embodiments, the television device includes the liquid crystal panel having high definition. However, the present invention may be applied to display devices other than television devices.

The technical elements described in this specification and the drawings may be used independently or in combination to achieve the technical benefits. The combinations are not limited to those in original claims. With the technologies described in this specification and the drawings, multiple objects may be accomplished at the same time. However, the technical benefits can be achieved by accomplishing even only one of the objects.

EXPLANATION OF SYMBOLS

TV: television device, CA, CB: cabinet, P: power source, T: tuner, S: stand, 10, 110, 210, 310, 410, 510: liquid crystal display device, 11, 111, 211, 311, 411, 511: liquid crystal panel, 12, 112, 212, 312, 412, 512: backlight unit, 13, 113, 213, 313, 413, 513: bezel, 14, 114, 214, 314, 414, 514: frame, 15, 115, 215, 315, 415, 515: chassis, 15A, 115A, 215A, 315A, 415A, 515A: bottom plate, 15A1, 115A1, 215A1, 315A1, 415A1, 515A1: light guide plate supporting portion, 15A2, 115A2, 215A2, 315A2, 415A2, 515A2: light source supporting portion 15A2, 16, 116, 216, 316, 416, 516: optical sheet, 18, 118, 218, 318, 418, 518: light guide plate, 24, 124, 224, 324, 424, 524: LED, 25, 125, 225, 325, 425, 525: LED board, 28: gate flexible circuit board, 30, 130, 230, 330, 430, 530: source flexible circuit board, 32, 132, 232, 332, 432, 532: source circuit board, 34, 134, 234, 334, 434, 534: board cover, LU: LED unit, HS1: first heat dissipation sheet, HS2: second heat dissipation sheet, HS3: third heat dissipation sheet, HS4: fourth heat dissipation sheet, HS5: fifth heat dissipation sheet, HS6: sixth heat dissipation sheet, HS7: seventh heat dissipation sheet, GD: gate driver, SD: source driver

The invention claimed is:
1. A display device comprising:
a light source;
a light guide plate including at least one side surface that is a light entrance surface opposed to the light source;
a chassis including at least a bottom plate that includes a surface on which at least the light source and the light guide plate are arranged, and includes a light source supporting portion and a light guide plate supporting portion, the light source supporting portion supporting the light source, the light guide plate supporting portion supporting the light guide plate;

a display panel arranged over a plate surface of the light guide plate opposite from a plate surface of the light guide plate facing the chassis;

a flexible circuit board having flexibility and including an end connected to the display panel, the flexible circuit board being bent and a portion of the flexible circuit board is opposed to another surface of the light source supporting portion of the bottom plate;

a signal transmission circuit board connected to another end of the flexible circuit board and arranged over the other surface of the light source supporting portion of the bottom plate for transmitting a signal to the flexible circuit board; and a first heat dissipation member sandwiched between the light guide plate supporting portion of the bottom plate and the flexible circuit board and in contact with the other surface of the light guide plate supporting portion of the bottom plate and with the flexible circuit board.

2. The display device according to claim 1, further comprising a second heat dissipation member sandwiched between the other surface of the light guide plate supporting portion of the bottom plate and the signal transmission circuit board and in contact with the other surface of the light guide plate supporting portion of the bottom plate and the signal transmission circuit board.

3. The display device according to claim 1, further comprising:

a circuit board cover covering a surface of the signal transmission circuit board opposite from a surface of the signal transmission circuit board facing the other surface of the bottom plate; and a third heat dissipation member sandwiched between the signal transmission circuit board and the circuit board cover and in contact with the signal transmission circuit board and the circuit board cover.

4. The display device according to claim 3, wherein the circuit board cover including an extending portion that extends to the flexible circuit board and covers a portion of the flexible circuit board opposed to the light source supporting portion, and the display device further comprising a fourth heat dissipation member sandwiched between the flexible circuit board and the fourth heat dissipation member and in contact with the flexible circuit board and the fourth heat dissipation member.

5. The display device according to claim 1, further comprising:

a light source board on which the light source is mounted; and a fifth heat dissipation member including at least a portion sandwiched between the light source board and the chassis and in contact with the light source board and the chassis.

6. The display device according to claim 5, wherein the fifth heat dissipation member is in contact with a plurality of surfaces of the light source board.

7. The display device according to claim 1, further comprising:

a bezel having a frame shape, the bezel being opposite the surface of the bottom plate of the chassis and connected to the chassis;

a driving component mounted on the flexible circuit board for processing the signal from the signal transmission circuit board and transmitting a processed signal to the display panel for driving the display panel; and a sixth heat dissipation member sandwiched between the bezel and a portion of the flexible circuit board on which the driving component is mounted and in contact with the bezel and the portion of the flexible circuit board on which the driving component is mounted.

8. The display device according to claim 1, wherein the light source supporting portion of the bottom plate protrudes from the other surface of the bottom plate so as to form a step with the light guide plate supporting portion.

9. The display device according to claim 8, further comprising a reflection sheet that is in contact with the other surface of the bottom plate.

10. The display device according to claim 9, wherein the reflection sheet is sandwiched between the light guide plate and the other surface of the bottom plate and in contact with the light guide plate and the other surface of the bottom plate.

11. The display device according to claim 1, wherein the flexible circuit board includes a plurality of flexible circuit boards arranged along at least an end of the display panel, and the first heat dissipation member is arranged such that the first heat dissipation member closes an entirety of an air gap between the plurality of the flexible circuit boards and the other surface of the bottom plate.

12. The display device according to claim 1, wherein the display panel is a liquid crystal panel including liquid crystals.

13. A television device comprising the display device according to claim 1.

* * * * *